(12) United States Patent
Martinez Lerin

(10) Patent No.: US 12,287,894 B2
(45) Date of Patent: Apr. 29, 2025

(54) PERMISSION SYNCHRONIZATION ACROSS COMPUTING SITES BASED ON USER AND RESOURCE CORRESPONDENCE

(71) Applicant: Hitachi, Ltd., Tokyo (JP)

(72) Inventor: Pablo Martinez Lerin, Kanagawa (JP)

(73) Assignee: HITACHI VANTARA, LTD., Yokohama (JP)

( * ) Notice: Subject to any disclaimer, the term of this patent is extended or adjusted under 35 U.S.C. 154(b) by 263 days.

(21) Appl. No.: 17/942,271

(22) Filed: Sep. 12, 2022

(65) Prior Publication Data

US 2024/0086559 A1  Mar. 14, 2024

(51) Int. Cl.
*G06F 21/62* (2013.01)
*G06F 16/27* (2019.01)

(52) U.S. Cl.
CPC .......... *G06F 21/6218* (2013.01); *G06F 16/27* (2019.01)

(58) Field of Classification Search
CPC .............................. G06F 21/6218; G06F 16/27
USPC ......................................................... 726/28
See application file for complete search history.

(56) References Cited

U.S. PATENT DOCUMENTS

| 10,891,312 B2 | 1/2021 | Ducott, III et al. |
| 2009/0138525 A1* | 5/2009 | Mattox, Jr. ............. G06F 16/27 |
| 2014/0130147 A1* | 5/2014 | Bajekal ............... G06F 21/6227 726/17 |

* cited by examiner

*Primary Examiner* — Bryan F Wright
(74) *Attorney, Agent, or Firm* — MATTINGLY & MALUR, PC

(57) ABSTRACT

In some examples, a computing device may determine a replication criteria for replication of user information and/or resource information between a first computing site and a second computing site. The computing device may perform the replication between the first computing site and the second computing site based on the replication criteria. Further, the computing device may determine at least one of a user correspondence or a resource correspondence between the first computing site and the second computing site based on performing the replication. The computing device may replicate permission information between the first computing site and the second computing site based at least on the user correspondence and/or the resource correspondence.

20 Claims, 13 Drawing Sheets

| Source site | Destination site | Replication scope | Naming strategy | Conflict resolution strategy |
|---|---|---|---|---|
| Site 1 | Site 2 | • Data file (as data object)<br>• Data share (as data buckets) | • For data shares, replace suffix "-Share" by ".bucket1"<br>• For data files, same name | N/A |
| Site 1 | Site 3 | • Data share (as data blob)<br>• Exclude data share "Local-Share" | • Same name | • Skip resource and send message |

FIG. 6

| Site 1 | Site 2 | Site 3 |
|---|---|---|
| Administrators (user group) | Role1 (user role) | Administrators (user group) |
| Developers (user group) | Role2 (user role) | Developers1 (user group) |
| Guest (user account) | Not replicated | Guest8 (user account) |

FIG. 7

| User | Resource | Access |
|---|---|---|
| Developers (user group) | DevTeam-Share (data share) | Read, Write |

FIG. 9A

| User | Resource | Access |
|---|---|---|
| Role2 (user role) | DevTeam.bucket1 (data bucket) | Read, Write |

FIG. 9B

| User | Resource | Access |
|---|---|---|
| Developers1 (user group) | DevTeam-Share (data blob) | Read, Write |

FIG. 9C

PERMISSION SYNCHRONIZATION ACROSS COMPUTING SITES BASED ON USER AND RESOURCE CORRESPONDENCE

BACKGROUND

In recent years, information technology has transitioned from users interacting with privately owned servers and data centers to the widespread use of commercially available computing and storage resources provided at multiple computing sites such as edge sites and public cloud sites. These commercial computing services are provided by third-party entities and typically include computing resources that are shared with other customers of the third-party entities. In some cases, users may be able to access resources such as data and applications from any of these computing sites. For instance, when users need to access resources, the user (or user's computing device) may select the best site based on cost-efficiency, performance, proximity to customers or partners, or various other considerations.

In such an arrangement, users and resources may need to be replicated from one computing site to another computing site, such as in advance or on demand. In addition, permissions may need to be configured to enable users to access resources at some or all of the sites to ensure secure and seamless access. However, in these multi-site computing environments, administrators often are tasked with configuring individual data access permissions for a large number of users at each computing site. When performed manually by an administrator, these tasks may be prone to human-error. Further, repeating the permission configuration at each computing site and keeping the permissions updated as users and resources change may impose a serious burden on administrators.

SUMMARY

In some implementations, a computing device may determine a replication criteria for replication of user information and/or resource information between a first computing site and a second computing site. The computing device may perform the replication between the first computing site and the second computing site based on the replication criteria. Further, the computing device may determine at least one of a user correspondence or a resource correspondence between the first computing site and the second computing site based on the replication. The computing device may replicate permission information between the first computing site and the second computing site based at least on the user correspondence and/or the resource correspondence.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example resource replication criteria data structure according to some implementations.

FIG. 7 illustrates an example user correspondence data structure according to some implementations.

FIGS. 9A-9C illustrate example storage permission data structures according to some implementations.

DESCRIPTION

Figure 1:
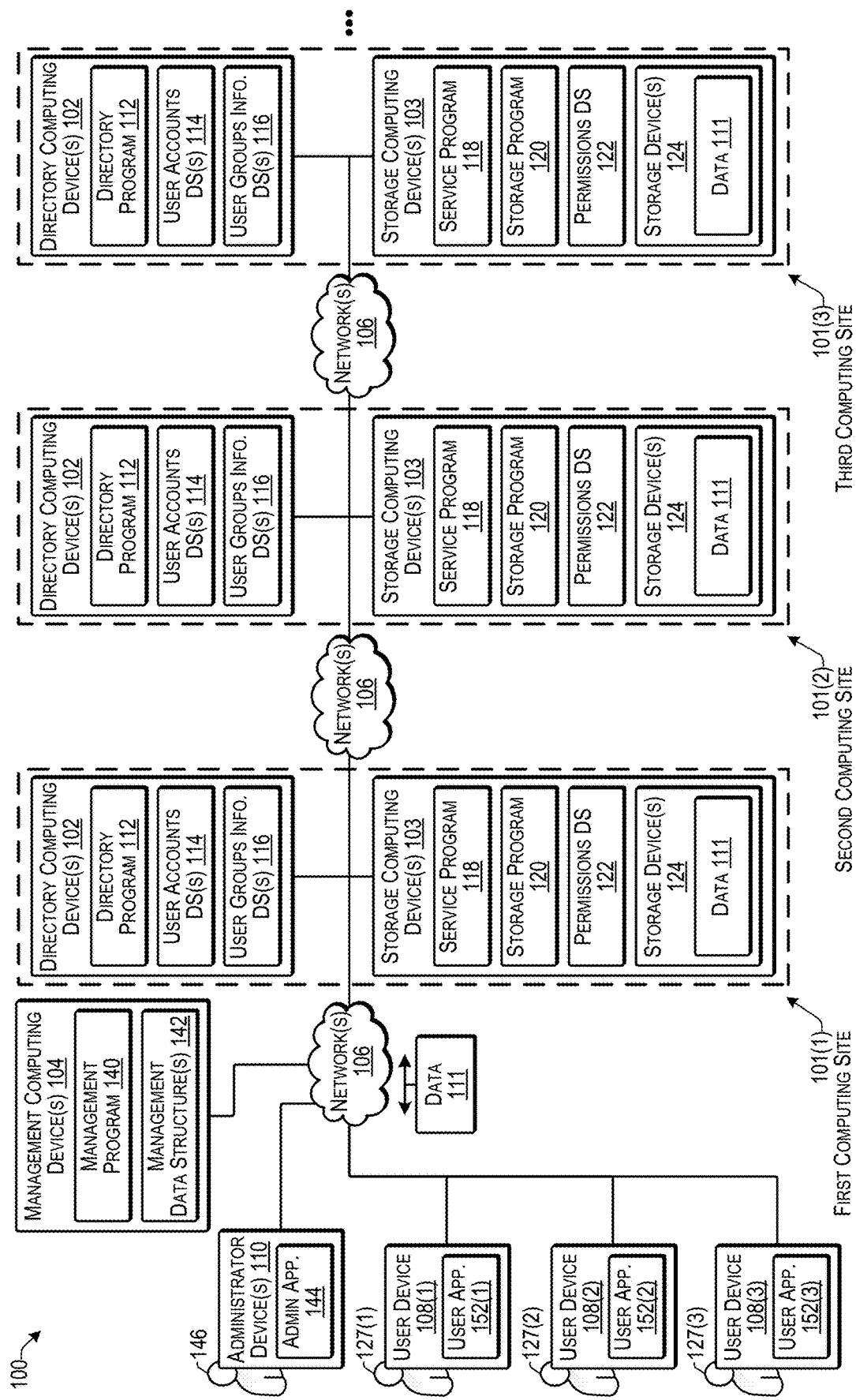
FIG. 1 illustrates an example architecture of a system enabling automated permission replication according to some implementations.

Some implementations herein are directed to techniques and arrangements for replicating and synchronizing users and resources across a plurality of computing sites automatically, such as based on a replication criteria that includes rules for adjusting to different naming mechanisms, conflicts, and software that may be in effect at each site. Additionally, some implementations herein may construct a correspondence between the replicated users and resources at each site, and may replicate the permissions for users and resources based on the constructed correspondence. Furthermore, some examples herein may enable administrators to automatically replicate data access permissions in a hybrid cloud environment that includes multiple computing sites with various different technologies and/or naming mechanisms, which provides a significant advance over conventional techniques that may require the same technology and naming mechanisms.

According to the examples herein, users are able to access their data and applications securely and seamlessly in a hybrid cloud environment. This configuration improves cost-efficiency because users (or user devices) are able to choose which computing sites to use according to current requirements. Furthermore, the examples herein increase access security because the permissions can be correctly configured to avoid unauthorized access, while the automation of the process mitigates the risk of human error and facilitates security auditing. In addition, computing-site access procedures become seamless for the users because the users may have the same permissions at all of the computing sites that they are authorized to access, so the users may have the same user experience at each computing site. Additionally, some examples herein include a product or service to replicate users, resources, and/or permissions in hybrid cloud environments. The techniques described herein solve the problems mentioned above by automatically generating correspondences between users and resources for each computing site, and by replicating the permissions based on the generated correspondences.

Furthermore, some examples include accessing knowledge for translating between different classification designations. For instance, in large scale systems with many users and resources, it may not be feasible to manually build the knowledge and keep the knowledge updated. As one example, a conventional system may assume that the user identifiers (IDs) and the resource IDs are the same across all sites. However, this often may not be the case for systems that include hybrid cloud environments and/or public cloud computing devices. For example, hybrid cloud environments may integrate multiple sites with varied technologies and naming mechanisms. The difference in technology and naming mechanisms may require the use of different IDs, group organizations, and the like, when replicating users and resources from a source computing site to a destination computing site.

Further, public clouds may have existing users and resources from multiple different customers, which may cause naming conflicts when replicating users and resources from a source computing site to a destination computing site at a public cloud or other commercial computing site. Any such naming conflicts may typically need to be resolved, such as by choosing an ID that is different from the ID used at the source site. This may create a problem when replicating permissions because the user ID and resource ID used in the permissions may not be recognized at the destination site. Moreover, the user ID and resource ID may be used for different users or resources, which can create a security issue. As one example, if a user has permissions enabled to access a particular resource, the user may be expected to have permission to access that resource at any of the computing sites. On the other hand, if the user does not have permission to access a particular resource at one computing site, the user similarly should not have permission to access that resource at any of the other computing sites that the user is authorized to access.

For discussion purposes, some implementations are described in the environment of multiple computing systems in communication with each other, and which may each be accessible by the same users. However, implementations herein are not limited to the particular examples provided, and may be extended to other types of computing system architectures, other types of network configurations, other types of storage environments, other types of client configurations, other types of data and data structures, and so forth, as will be apparent to those of skill in the art in light of the disclosure herein.

FIG. 1 illustrates an example architecture of a system 100 enabling automated permission replication according to some implementations. The system 100 includes a plurality of computing sites 101, such as a first computing site 101(1), a second computing site 101(2), a third computing site 101(3), and so forth. In the illustrated example, each computing site 101 may include one or more directory computing devices 102 that are able to communicate with one or more storage computing devices 103 and one or more management computing devices 104 through one or more networks 106. The computing sites 101(1), 101(2), and 101(3) are also able to communicate with each other over the one or more networks 106.

In some cases a management computing device 104 may be physically located at each of the computing sites 101, while in other cases, the management computing device 104 may be physically located at one or more of the computing sites 101, while in still other cases, the management computing device 104 may be physically located separate from the computing sites 101. Further, at least the one or more storage computing devices 103 are able to communicate over the one or more networks 106 with one or more user computing devices 108, such as user devices 108(1), 108(2), 108(3), . . . , which may be any of various types of computing devices, as discussed additionally below. At least the management computing device(s) 104 may be able to communicate with an administrator computing device 110 over the network(s) 106. Alternatively, in other examples, the management computing device 104 and the administrator computing device 110 may be the same physical computing device.

The one or more networks 106 may include any suitable network, including a wide area network (WAN), such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, a direct wired connection, or any combination of the foregoing. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail.

In some cases, the network(s) 106 may include a frontend network for transmitting communications, such as for storing or retrieving data 111, between the user device(s) 108 and one or more of the storage computing device(s) 103. Further, in some examples, the network(s) 106 may include a backend network for transmitting communications between the directory computing device(s) 102 and the storage computing device(s) 103, such as for providing access permission information from the directory computing devices 102 to the storage computing devices 103. In addition, the network(s) 106 may include a management network for enabling communication between the management computing device(s) 104 and the directory computing device(s) 102 and the storage computing device(s) 103. Regardless of the network configuration, the directory computing device(s) 102, the storage computing device(s) 103, the management computing device(s) 104, the user device(s) 108, and the administrator device(s) 110 are able to communicate over the one or more networks 106 using wired and wireless connections, and combinations thereof.

The directory computing device(s) 102, the storage computing device(s) 103, and the management computing device(s) 104 may each include one or more servers or any other suitable computing devices, as discussed additionally below, e.g., with respect to FIGS. 2-4. In the illustrated example, at least the respective directory computing device(s) 102 and the storage computing device(s) 103 are associated with a respective computing site 101. For instance, the directory computing device(s) 102 and the storage computing device(s) 103, and, in some cases, the management computing device(s) 104 associated with a particular computing site 101 may be physically located at the same particular computing site 101, such as the same data center, same computer cluster, same computer group, same geographic location, or the like. Alternatively, in other examples, the directory computing device(s) 102, the storage computing device(s) 103, and/or the management computing device(s) 104 associated with the same computing site 101 may be physically located at different data centers, different computer clusters, different computer groups, different geographic locations (e.g., different cities, different states, different countries), and so forth. Accordingly, implementations herein are not necessarily limited to co-location of the various computing devices at the same data center, same computer cluster, same computer group, same geographic location, etc. Additionally, as another alternative, the directory computing device(s) 102, the storage computing device(s) 103 and/or the management computing device(s) 104 may be included in the same physical computing device(s) as the same computing site 101, and may be run on virtual machines, or the like. For instance, one or more physical computing devices at a computing site 101 may be configured as a pool of virtual machines and a pool of containers that may be used to implement the directory computing device(s) 102, the storage computing device(s) 103, and/or the management computing device(s) 104 at the computing site 101. Numerous other variations will be apparent to those of skill in the art having the benefit of the disclosure herein.

The directory computing device(s) 102 may include a directory program 112 that may be executed on the directory computing device(s) 102 for managing user permission information and for responding to requests from the storage computing devices 103, such as regarding access permissions for particular users, user groups, resources, and the like. The directory computing device 102 may store and/or otherwise maintain one or more user accounts data structures 114 and one or more user groups data structures 116. For example, a user account may include information associated with a particular user, such as a username and password. Furthermore, a user group may include a logical grouping of user accounts. A user account may be associated with one or more user groups.

The directory computing device(s) 102 may communicate with the storage computing devices 103 to respond to user validation requests received from the storage computing devices 103. For example, the directory computing device 102 may respond that a user identity is valid only when information such as username and password provided in the user validation request matches information associated with a valid user account registered in the user account data structure 114 maintained by the directory computing device 102. The response of the directory computing device 102 to a user validation request may include information related to the user account that matches the user identity in the user validation request and the user group(s) associated with the particular user account, if any. The directory computing device(s) 102 communicates with the management computing device 104, such as to receive management requests, which may include registering a new user account or associating a user account with a user group. In some cases, the directory computing device(s) 102 may be configured to forward some or all user validation requests to one or more other directory computing device(s) 102 that may be located at different computing sites 101.

The storage computing device(s) 103 may each include a service program 118 that may be executed on the storage computing device(s) 103 to send the data 111 to, and receive the data 111 from the user devices 108. The storage computing device(s) 103 may further include a storage program 120 that may be executed on the storage computing device(s) 103 to store the data 111, respectively, on one or more storage devices 124 associated with the storage computing device(s) 103. In addition, the storage computing device(s) 103 may include a storage permissions data structure 122 that may contain data access permissions for users and user groups for accessing resources maintained by the respective storage computing device(s) 103. As one example, a data access request may include a data access operation, an indication of the target data, and the user identity of a user 127 that is a source of the data access request.

Furthermore, the storage computing device(s) 103 may communicate with the management computing devices 104 to receive management requests such as for configuring data access permissions for users and user groups. The storage computing device(s) 103 may communicate with the directory computing devices 102 such as for sending user validation requests to the respective directory computing device(s) 102. When a storage computing device 103 receives a data access request from a user device 108, the storage computing device 103 may validate the user identity by sending the data access request to the directory computing device(s) 102. In response, the storage computing device 103 may receive information related to the associated user account and user group, if any.

If the user identity is not valid, the storage computing device 103 may reject the data access request. On the other hand, if the user identity is determined to be valid, the storage computing device 103 may validate the authorization of the data access request by using the information contained in the storage permissions data structure 122. As one example, the data access request may be authorized only when the storage permissions data structure 122 contains a row with the access operation, the target data, and the user account or user group associated with the data access request. When the data access request is not authorized according to the storage permissions data structure 122, the storage computing device 103 may reject the data access request. Otherwise, the storage computing device 103 may fulfill the data access request.

In some examples, the storage computing device 103 may implement a cache technique for avoiding the need to communicate with the directory computing device 102 for each data access request. Additionally, in some examples, the storage permissions data structure 122 and the data access request authentication and authorization logic may be decoupled from the service program 118, and may instead be executed at a separated server, such as a designated identity and access management server.

In some cases, the storage device(s) 124 may include arrays of storage devices, while in other examples, the storage device(s) 124 may be storage devices that are included in, or otherwise associated with, individual servers of the storage computing device(s) 103, respectively. Furthermore, the storage devices 124 accessed by the storage computing device(s) 103 may be of a plurality of different types, configurations, etc., as discussed additionally below. For example, the storage devices 124 at the first computing site 101(1) may be different types of storage devices and/or may use different storage protocols from those maintained at the second computing site 101(2) and/or at the third computing site 101(3). Numerous other possible configurations and variations of the storage device(s) 124 will be apparent to those of skill in the art having the benefit of the disclosure herein.

The service program 118, may enable the storage computing device(s) 103 to respond to data write requests from the user devices 108, such as for storing application data and/or user data as a portion of the data 111. The storage program 120 may also provide the user devices 108 with requested data, such as in response to data read requests. Further, the data 111 may include system data 136. As one example, the system data may be created by the storage computing device(s) 103, such as by the storage program 120 creating metadata and other system data that is related to the user data, and which may also be included in the data 111. For instance, the system data may include storage configurations, container names, storage locations, storage paths, data storage life, data protection level, and the like, for each stored data object or other stored data included in the data 111. The storage program 120 may configure the storage computing device(s) 103 to perform various other functions, such as for providing archiving, storage protection levels, storage class hierarchies, garbage collection, replication of the data 111 to other computing sites 101 for backup and disaster recovery, and so forth.

The management computing device(s) 104 may execute a management program 140 that employs one or more management data structures 142 for setting specific application permissions for specific users 127 within the system 100. For example, an administrator application 144 may be executed on the administrator device 110 by an administrator user 146 to invoke execution of and/or to interact with the management program 140. In some examples, the administrator user 146 may use the administrator application 144 to manually assign data access permissions to the users 127, such as based on information received from the management program 140 and/or from the users 127 or other sources. The administrator user 146 may further interact with the management computing device 104 to manage the directory computing device(s) 102 and the storage computing device(s) 103, such as by sending management requests for performing management tasks. Examples of management tasks may include registering new user accounts in the directory computing device(s) 102 and configuring user access permissions in the storage permissions data structure 122 maintained by the storage computing device(s) 103.

The management program 140 may employ one or more management data structures 142 for determining and assigning data access permissions for users 127 and user groups. Details of the management data structures 142 are discussed additionally below. Additionally, while the management data structures 142 are illustrated as being stored on the management computing device 104 in this example, in other examples, the management data structures 142 may be stored additionally, or alternatively, on the storage computing device(s) 103, and may be updated by the management program 140 as updates occur.

In some examples, the management program 140 may include a web app or the like, that communicates with an administrator application 144 executing on the administrator device 110. In additional examples, the management program 140 may include any other suitable type of program, user interface, or the like that provides at least the administrative user 146 with the ability to cause the management computing device 104 to perform the functions described herein. Additionally, while the management program 140 and the management data structures 142 are illustrated as being installed on the management computing device 104 in this example, in other examples, the management program 140 and/or the management data structures 142 may be installed on one or more of the directory computing device(s) 102 and/or the storage computing device(s) 103 instead of, or in addition to, being installed on the management computing device(s) 104. Furthermore, the administrator user 146 may be responsible for other configuration and management operations for the directory computing device(s) 102 and the storage computing device(s) 103 in the system 100 for ensuring proper operation, as is known in the art.

Each user device 108 may be any suitable type of computing device such as a desktop, laptop, tablet computing device, mobile device, smart phone, wearable device, and/or any other type of computing device able to send data over a network. Users 127 may be associated with user devices 108, respectively, such as through a respective user account, user login credentials, or the like. Additionally, the user devices 108 may be able to communicate with the directory computing device(s) 102 and the storage computing device(s) 103 through the one or more networks 106 or through any other suitable type of communication connection.

Further, each user device 108(1), 108(2), 108(3), . . . , may be associated with a respective user 127(1), 127(2), 127(3), . . . , such as through login information or the like, and may include at least one respective user application 152(1), 152(2), 152(3), . . . , that may execute on the respective user device 108(1), 108(2), 108(3), . . . , such as for communicating with the storage computing device(s) 103, such as for sending data access requests for storing data 111 with the storage computing device(s) 103, for retrieving data 111 from the storage computing devices 103, and/or for performing other tasks. As one example, a data access request includes the data access operation, the target data, and the user identity of the user that is interacting with the user computing device 108. Examples of data access requests include read, write, delete, overwrite, read metadata, and write metadata. The target data may be represented by a data path to a file in a file system. The user identity may be represented by a username and a password that proves the identity belongs to the user who sent the data access request.

In some examples, the user application 152 may include a browser or may operate through a browser, and the service program 118 may include a web application (not shown in FIG. 1) for enabling a user 127 to access data 111 through one of the storage computing devices 103. Alternatively, in other cases, the user application 152 may include any other type of application having communication functionality enabling communication over the one or more networks 106 with the storage computing device(s) 103 and, in some cases, the directory computing device(s) 102 and/or the management computing device(s) 104.

In the system 100, there may be hundreds or thousands of users 127. The users 127 may be individuals, groups of individuals, or processes. For instance, as one example, the first user 127(1) may be a group of individuals employed by an entity, such as a human resources team, a sales team, an engineering department, or the like, who all have the same data access permissions within the system 100, or at least within a portion of the system 100. The users 127 may store data 111 to, and may receive data 111 from, the storage computing device(s) 103 that their respective user devices 108 are in communication with. For example, the storage computing device(s) 103 may provide storage services for the users 127 and their respective user devices 108. Examples of data access requests may include read, write, delete, overwrite, read metadata, and write metadata. In some cases, the user data may be represented by a data path to a file in a file system associated with the user. The users 127 may often interact with storage computing device(s) 103 located at a computing site 101 that is geographically close to a location of the respective user 127, but in other examples the users may interact with storage computing device(s) 103 at computing sites 101 at more remote locations, such as in other states, other countries, etc. Numerous variations will be apparent to those of skill in the art having the benefit of the disclosure herein.

During steady state operation there may be multiple user computing devices 108 periodically communicating with respective ones of the storage computing device(s) 103 for storing and retrieving data and/or communicating with the management computing device(s) 104, such as for executing instances of applications (not shown in FIG. 1) provided by the computing sites 101. Further, the storage computing device(s) 103 may communicate with the user devices 108 and/or the directory computing device(s) 102 to respond to data access requests. As mentioned above, in some cases, prior to responding to a data access request, the storage computing device(s) 103 may communicate with the directory computing device(s) 102 to validate data access requests from the user computing devices 108. When a data access request is not permitted based on the data access permissions stored in the storage permissions data structure 122, the storage computing device(s) 103 may send a reply that rejects the particular data access request. On the other hand, when the data access request is permitted, the storage computing device(s) 103 may fulfill the request.

As another example, the storage computing device(s) 103 may employ a cache technique of storing the data access permission information for users and applications in a cache memory to avoid having to communicate with the directory computing device(s) 102 for each data access request. Furthermore, in some cases, the storage computing device(s) 103 may communicate with an identity provider (not shown in FIG. 1) to validate the identity of the users 127 and/or the administrator users 146.

In some cases, the computing sites 101(1), 101(2), 101(3), . . . , may be geographically remote from each other such as to protect the stored data 111 against a disaster or the like, such as in different cities, different states, different countries, or other distance sufficient that a disaster that affects one computing site 101 is unlikely to affect the other computing sites 101. In other examples, rather than being geographically remote, the computing sites 101(1), 101(2), 101(3), . . . , may be geographically near to each other or at the same geographical location, but otherwise able to provide redundancy protection in the event of failure of the one of the computing sites 101(1), 101(2), 101(3), . . . , such as by being located on a different server cluster, different network connection, different electrical circuit, or the like. Further, the computing sites 101 may also have other types of resources not illustrated in FIG. 1, such as compute resources so that users are able to execute and access applications at each computing site 101.

One advantage of each computing site 101 having its own directory computing device(s) 102 and storage computing device(s) 103 is to provide redundancy so that users 127 are able to continue accessing data and other resources in other computing sites 101 when one of the computing sites 101 experiences a failure. Additional advantages of each computing site 101 having its own directory computing device(s) 102 and storage computing device(s) 103 is that the servers at each computing site 101 are able to offer different functionality, performance, technology, licensing, and so forth, so that users 127 are able to choose one of the computing sites 101 at which to access data and other resources based on the users' current requirements.

Some examples herein include automatically generating and configuring data access permissions for users and/or user groups. For example, users 127 with user accounts registered in directory computing device(s) 102 may access data stored in the storage computing device(s) 103 via the user computing devices 108. In examples herein a user may be a person or a process that has a user account registered in the directory computing device(s) 102. A user account may include a user identity that typically has an associated username and password, and that may be used to identify a particular user that requests access to resources such as data in a secured system such as the computing sites 101. User accounts may be grouped into user groups to facilitate management and permission configuration. For example, suppose that a user group entitled "sales" may be used to represent all the employees of a particular organization that belong to the HR team of the organization.

Additionally, in the examples herein, data may include information that a user requests, via a user computing device 108 operating as a client computer, such as to write to the storage computing device(s) 103. For example, data may include content of a document, image, music, movie, and so forth. Data may also be generated by the storage computing device(s) 103, for example, such as to manage the functions and containers of the storage computing device(s) 103. Data may also be held in separated logical containers to facilitate access, management, and permission configuration. Examples of logical containers for data are drives, shares, buckets, blobs, folders, and the like. Furthermore, while several example configurations of a system 100 are described with reference to FIG. 1, numerous other configurations will be apparent to those of skill in the art having the benefit of the disclosure herein.

Figure 2:
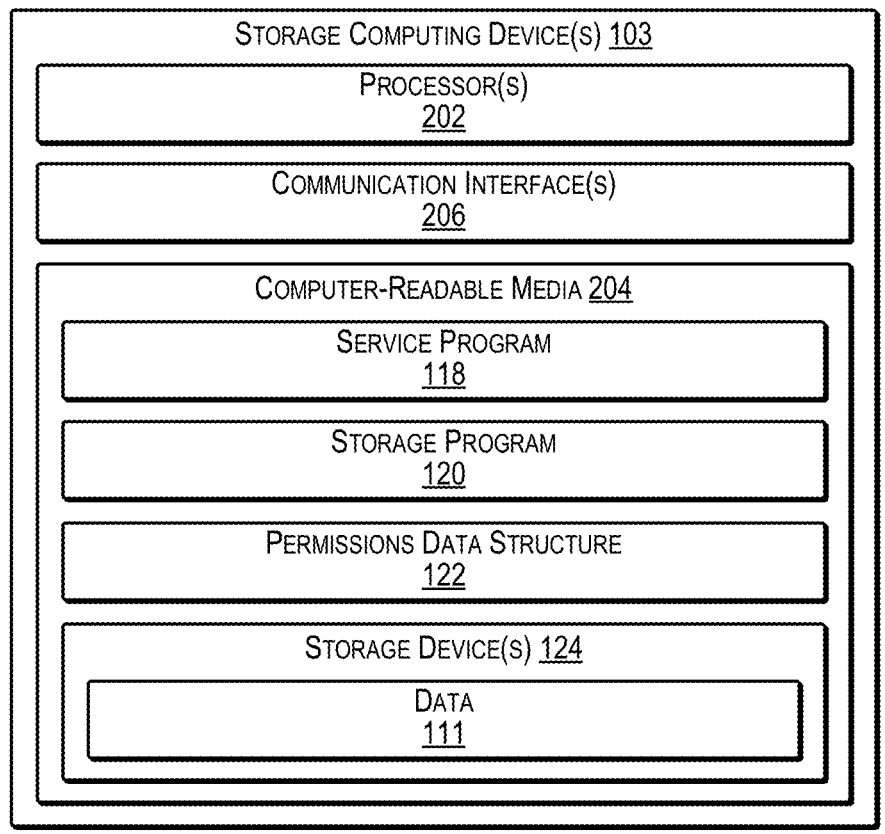
FIG. 2 illustrates an example hardware and logical configuration of the storage computing device(s) according to some implementations.

FIG. 2 illustrates an example hardware and logical configuration of the storage computing device(s) 103 according to some implementations. In some examples, a storage computing device 103 may include one or more servers that may be embodied in any number of ways. For instance, the programs, other functional components, and at least a portion of data storage of the storage computing device 103 may be implemented on at least one server, such as in a cluster of servers, a server farm, a data center, a cloud-hosted computing service, and so forth, although other computer architectures may additionally or alternatively be used. In the illustrated example, the storage computing device 103 includes, or may have associated therewith, one or more processors 202, one or more computer-readable media 204, and one or more communication interfaces 206.

Each processor 202 may be a single processing unit or a number of processing units, and may include single or multiple computing units, or multiple processing cores. The processor(s) 202 may be implemented as one or more central processing units, microprocessors, system-on-chip processors, microcomputers, microcontrollers, graphics processing units, digital signal processors, state machines, logic circuitries, and/or any devices that manipulate signals based on operational instructions. As one example, the processor(s) 202 may include one or more hardware processors and/or logic circuits of any suitable type specifically programmed or configured to execute the algorithms and processes described herein. The processor(s) 202 may be configured to fetch and execute computer-readable instructions stored in the computer-readable media 204, which may program the processor(s) 202 to perform the functions described herein.

The computer-readable media 204 may include both memory and storage. For example, the computer-readable media 204 may include volatile and nonvolatile memory and/or removable and non-removable media implemented in any type of technology for storage of information, such as computer-readable instructions, data structures, program modules, or other data. The computer-readable media 204 may include, but is not limited to, RAM, ROM, EEPROM, flash memory or other memory technology. Further, the computer-readable media 204 may include the storage devices 124, which may include any of magnetic disk storage, solid-state storage, optical storage, magnetic tape, storage arrays, network-attached storage, storage area networks, cloud storage, or any other medium that can be used to store the desired information and that can be accessed by a computing device. Depending on the configuration of the storage computing device 103, the computer-readable media 204 may include a tangible non-transitory media to the extent that, when mentioned, non-transitory computer-readable media exclude media such as energy, carrier signals, electromagnetic waves, and/or signals per se. In some cases, the computer-readable media 204 may be at the same location as the storage computing device 103, while in other examples, a portion of the computer-readable media 204 may be partially remote from the storage computing device 103. For instance, in some cases, the computer-readable media 204 may include a portion of storage located over a network from the storage computing device 103.

The computer-readable media 204 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the storage computing device 103. Functional components stored in the computer-readable media 204 may include the service program 118 and the storage program 120, each of which may include one or more computer programs, applications, executable code, or portions thereof. For example, the service program 118 may provide communication functionality with the user devices 108, while the storage program 120 may manage storage of data 111 on the storage devices 124.

In addition, the computer-readable media 204 may store data, data structures, and other information used for performing the functions and services described herein. For example, the computer-readable media 204 may include the storage devices 124, which store the data 111. The computer-readable media 204 may also store the storage permissions data structure 122.

The storage computing device 103 may also include or maintain other functional components and data, which may include programs, drivers, etc., and the data used or generated by the functional components. Further, the storage computing device 103 may include many other logical, programmatic, and physical components, of which those described above are merely examples that are related to the discussion herein.

The one or more communication interfaces 206 may include one or more software and hardware components for enabling communication with various other devices, such as over the one or more network(s) 106. Thus, the communication interfaces 206 may include, or may couple to, one or more ports that provide connection to the network(s) 106 for communicating with the directory computing device(s) 102, the management computing device(s) 104, the other storage computing devices 103, the user devices 108, and/or the administrator device(s) 110. For example, the communication interface(s) 206 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Figure 3:
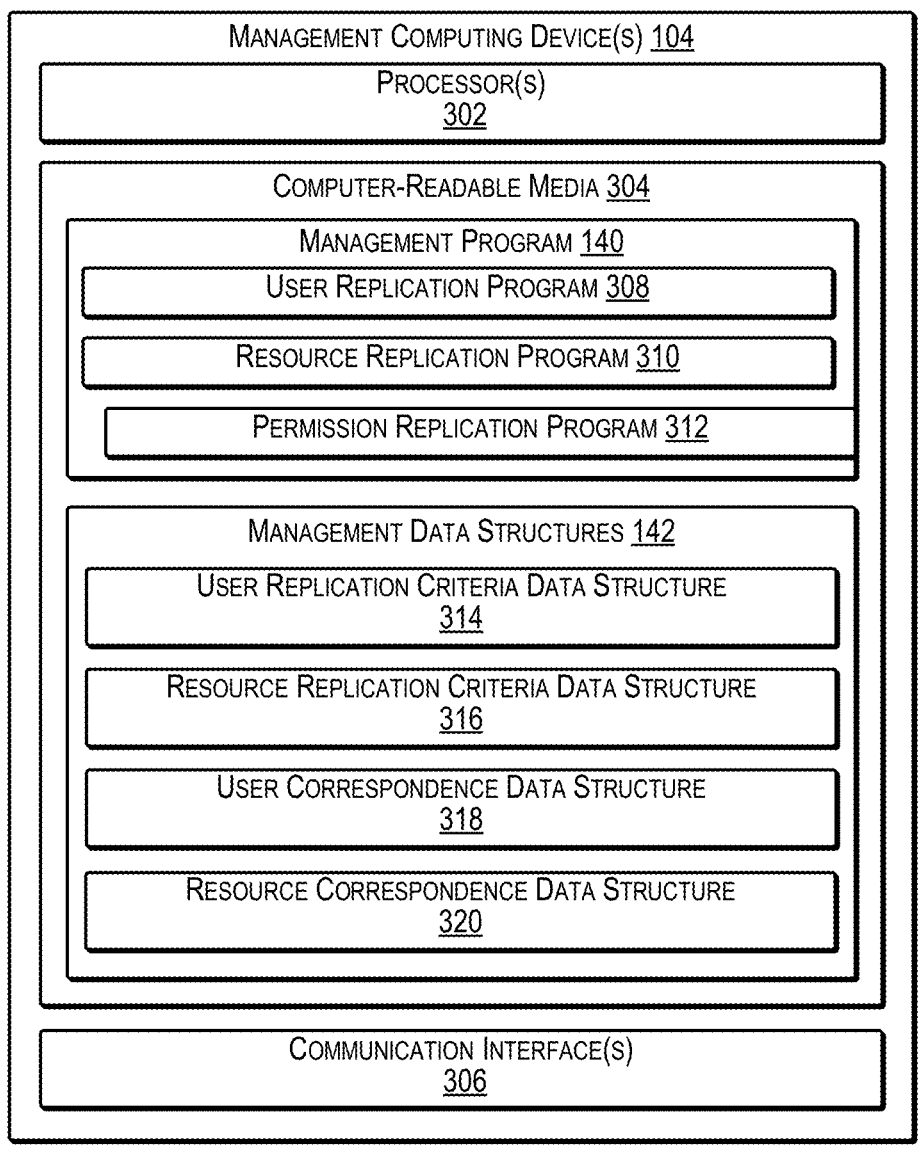
FIG. 3 illustrates an example hardware and logical configuration of the management computing device(s) according to some implementations.

FIG. 3 illustrates an example hardware and logical configuration of the management computing device(s) 104 according to some implementations. In some examples, a management computing device 104 may include one or more servers that may be embodied in any number of ways. For instance, the programs, other functional components, and at least a portion of data storage of the management computing device 104 may be implemented on at least one server, such as in a cluster of servers, a server farm, a data center, a cloud-hosted computing service, and so forth, although other computer architectures may additionally or alternatively be used. For instance, the management computing device 104 may alternatively be a personal computer, such as a desktop, laptop, tablet computing device, smartphone, wearable device, or the like.

The management computing device 104 may include one or more processors 302, one or more computer-readable media 304, and one or more communication interfaces 306. For example, the processors 302 may correspond to any of the examples discussed above with respect to the processors 202, the computer-readable media 304 may correspond to any of the examples discussed above with respect to the computer-readable media 204, and the communication interfaces 306 may correspond to any of the examples discussed above with respect to the communication interfaces 206.

The computer-readable media 304 may be used to store any number of functional components that are executable by the processor(s) 302. In many implementations, these functional components comprise instructions or programs that are executable by the processor(s) 302 and that, when executed, specifically program the processor(s) 302 to perform the actions attributed herein to the management computing device 104. Functional components stored in the computer-readable media 304 may include the management program 140, which may include one or more computer programs, applications, executable code, or portions thereof. For example, the management program 140 may include, or may execute, a user replication program 308, a resource replication program 310, and a permission replication program 312, as discussed additionally below. In some examples, the programs 308-312 may be integrated into the management program 140, while in other examples, one or more of these programs 308-312 may be separate programs that are accessed by the management program 140. Numerous other variations will be apparent to those of skill in the art having the benefit of the disclosure herein.

In addition, the computer-readable media 304 may store the management data structures 142, which may include user data, data object content, data structures, system data, and/or other information used for performing the functions and services described herein. For example, the management data structures 142 may include a user replication criteria data structure 314, a resource replication criteria data structure 316, a user correspondence data structure 318, and a resource correspondence data structure 320. Each of these management data structures 142 is discussed additionally below. Furthermore, while the management data structures 142 are illustrated as tables in the examples below, in other examples, other types of data structures may be employed.

The management computing device 104 may also include or maintain other functional components and data, which may include programs, drivers, etc., and the data used or generated by the functional components. Further, the management computing device 104 may include many other logical, programmatic, and physical components, of which those described above are merely examples that are related to the discussion herein.

Figure 4:
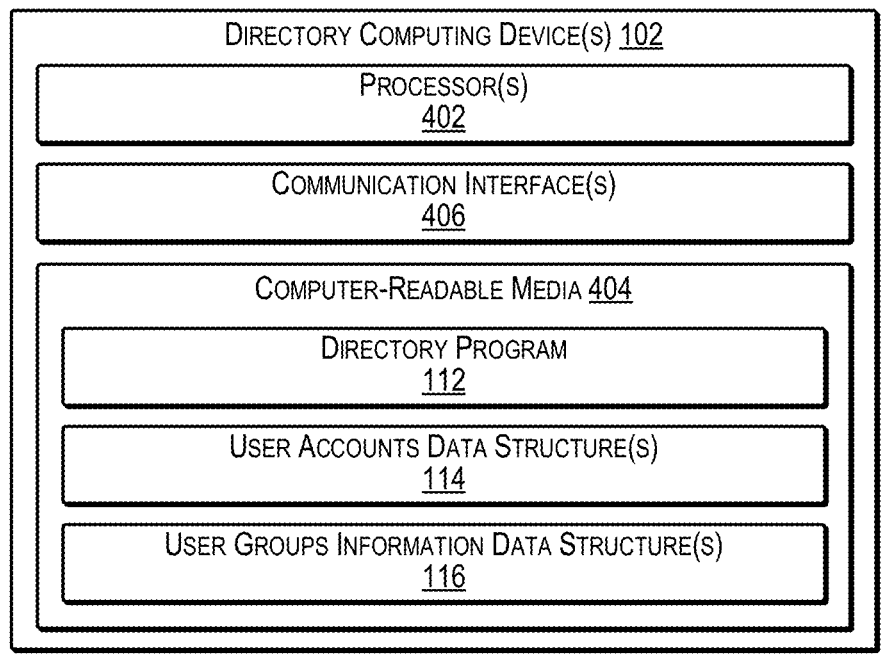
FIG. 4 illustrates an example hardware and logical configuration of the directory computing device(s) according to some implementations.

FIG. 4 illustrates an example hardware and logical configuration of the directory computing device(s) 102 according to some implementations. In some examples, a directory computing device 102 may include one or more servers that may be embodied in any number of ways. For instance, the programs, other functional components, and at least a portion of data storage of the directory computing device 102 may be implemented on at least one server, such as in a cluster of servers, a server farm, a data center, a cloud-hosted computing service, and so forth, although other computer architectures may additionally or alternatively be used. For instance, the directory computing device 102 may alternatively be a personal computer, such as a desktop, laptop, tablet computing device, smartphone, wearable device, or the like.

The directory computing device 102 may include one or more processors 402, one or more computer-readable media 404, and one or more communication interfaces 406. For example, the processors 402 may correspond to any of the examples discussed above with respect to the processors 202, the computer-readable media 404 may correspond to any of the examples discussed above with respect to the computer-readable media 204, and the communication interfaces 406 may correspond to any of the examples discussed above with respect to the communication interfaces 206.

The computer-readable media 404 may be used to store any number of functional components that are executable by the processor(s) 402. In many implementations, these functional components comprise instructions or programs that are executable by the processor(s) 402 and that, when executed, specifically program the processor(s) 402 to perform the actions attributed herein to the directory computing device 102. Functional components stored in the computer-readable media 404 may include the directory program 112, which may include one or more computer programs, applications, executable code, or portions thereof.

In addition, the computer-readable media 404 may store the user accounts data structure(s) 114, the user groups information data structure(s) 116, and/or other information used for performing the functions and services described herein. The directory computing device 102 may also include or maintain other functional components and data, which may include programs, drivers, etc., and the data used or generated by the functional components. Further, the directory computing device 102 may include many other logical, programmatic, and physical components, of which those described above are merely examples that are related to the discussion herein.

Figure 5:
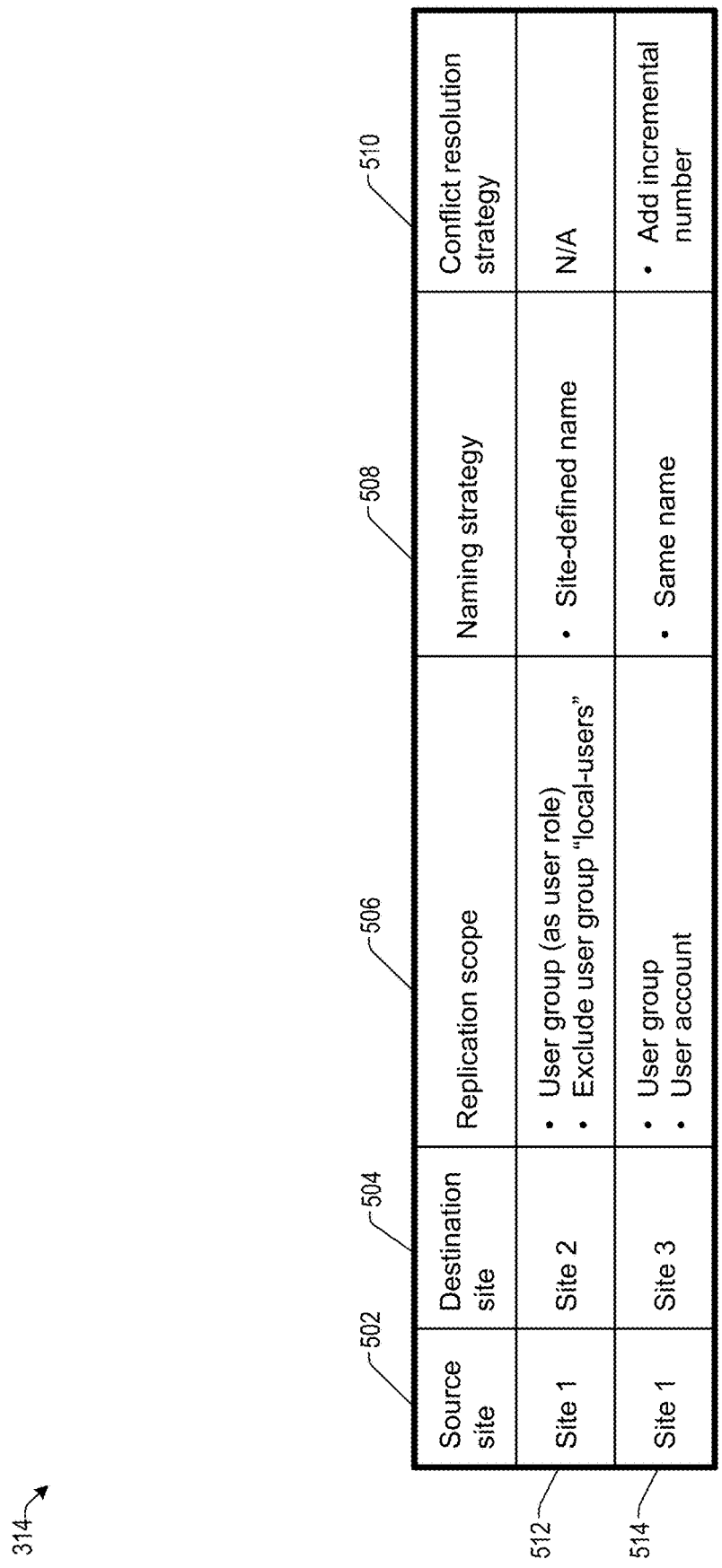
FIG. 5 illustrates an example user replication criteria data structure according to some implementations.

FIG. 5 illustrates an example user replication criteria data structure 314 according to some implementations. In the illustrated example, information in the user replication criteria data structure 314 includes a source site 502, a destination site 504, a replication scope 506, a naming strategy 508, and a conflict resolution strategy 510. In this example, the data structure 314 further includes a first row 512 showing the relationship between the first computing site (Site 1) as the source site 502 and the second computing site (Site 2) as the destination site 504. In addition, a second row 514 shows a relationship between the first computing site (Site 1) as the source site 502, and the third computing site (Site 3) as the destination site 504. Each row of the user replication criteria data structure 314 shows information of criteria 506, 508, and 510 to replicate objects stored in the directory computing device 102 from a source site 502 to a destination site 504.

The source site 502 shows a source site identifier that represents a computing site 101 that is the source of the replicated information. The source site identifier indicated at 502 may be a numerical value and/or a text value, but it is not limited to these. The source site identifier indicated at 502 may be automatically generated by the system 100, or may be defined by the administrator user 146 discussed above.

The destination site 504 shows a destination identifier that represents a computing site 101 that is a destination of the replication. The destination identifier may be a numerical value and/or a text value, but it is not limited to these. The destination identifier indicated at 504 may be automatically generated by the system 100 or may be defined by the administrator user 146.

The replication scope 506 may include a list of one or more types of objects stored in the directory computing device 102 that can be replicated to the destination site indicated at 504. Examples of types of objects that may be replicated are "user account", "service account", "user group", and/or "user role". When a type of object appears in the replication scope 506, this may indicate that all the objects of that type should be replicated. In some examples, the replication scope 506 may include filters to specify that only objects in one or more specific directory computing devices 102 of all the directory computing devices 102 at the identified source site 502 should be replicated. As another example, the replication scope 506 may include filters to specify that only a subset of the objects of a particular type should be replicated. Examples of filters may include a prefix for an object name and/or a suffix for an object name. The replication scope 506 may be useful because one or more types of objects may not need to be replicated because they may already have been replicated by other means. A replication scope 506 may also be useful because a type of object may not need to be replicated because the directory computing device 102 at the indicated destination site 504 may have been configured to retrieve that type of object from the indicated source site 502 on demand. Additionally, a filter for the replication scope 506 may be useful because some objects may not be needed at the destination site 504 or may not be allowed at the destination site 504 according to security policies, incompatibilities, or the like. In addition, the replication scope 506 may also include a conversion from one type of object to one or more other types of objects. For example, type conversion may be useful when the types of objects stored in the directory computing device 102 at the source site identified at 502 are different from the types of object able to be used at the destination site indicated at 504.

The naming strategy 508 may set forth a strategy to select a name or identifier at the destination site 504 for each object stored in the directory computing device 102 that is to be replicated to the indicated destination site 504. The naming strategy 508 may be represented, for example, by a sentence, by a script, by a set of instructions, by a path to an executable program, and so forth. For example, one naming strategy goal may be to be close to the name in the indicated source site 502 for ease of use, while also not conflicting with existing names in the destination site indicated at 504. The naming strategy 508 may be employed because replicating an object in the directory computing device 102 may require creating a new object at the destination site 504 by providing a name for the object. Some computing sites 101 may provide a site-defined name for new objects. Some sites may have a naming mechanism where a part of the name is provided by the person or process creating the object and part of the name is site-defined. Some sites may suggest a name that does not conflict with existing objects. Optionally, the naming strategy 508 may also include the target directory computing device 102 to which resources are to be replicated. This may be useful when there are multiple directory computing devices 102 at the same computing site 101.

The conflict resolution strategy 510 may include a strategy for solving naming conflicts at the destination site 504 for each user account and/or user group that is replicated. The conflict resolution strategy 510 may be represented, for example, by a sentence, by a script, by a set of instructions, by a path to an executable program, and so forth. A conflict resolution strategy 510 may not always be necessary. For example, if the naming strategy 508 is to accept the site-defined name, then it should never conflict and therefore "N/A" or some other such indicator may be entered at 510. A typical conflict resolution strategy 510 may be to add a suffix or a prefix to the name of the object received from the source site 502.

The user replication criteria data structure 314 may have one or more rows. The rows may be added or deleted in response to a request by the administrator user 146. Vendors may provide guidelines or default values to assist the administrator user in adding information to the user replication criteria data structure 314. For example, row 512 in the user replication criteria data structure 314 shows that all objects of type "user group" stored in the directory computing device 102 at the first computing site (Site 1), except the user group "local-users" should be replicated to the second computing site (Site 2) to use as "user roles" with a name specified by the second computing site (Site 2).

As another example, row 514 in the user replication criteria data structure 314 shows that all objects of type "user account" and "user group" stored in the directory computing device 102 at the first computing site (Site 1) should be replicated to the third computing site (Site 3) with the same name as they have at the first computing site (Site 1). Row 514 further indicates that in the event of a name conflict, an incremental number should be added to the name of the object to resolve the naming conflict.

FIG. 6 illustrates an example resource replication criteria data structure 316 according to some implementations. In the illustrated example, information in the resource replication criteria data structure 316 includes a source site 602, a destination site 604, a replication scope 606, a naming strategy 608, and a conflict resolution strategy 610. Further, each row of the resource replication criteria data structure 316 shows information related to the criteria 606, 608, 610 to replicate resources stored in the storage computing device 103 or other servers, such as compute servers, from a source site indicated at 602 to a destination site indicated at 604.

The source site is as indicated at 602 by an identifier that represents the source computing site 101 (Site 1) may. The identifier can be a numerical value and/or a text value, but it is not limited to these. The identifier indicated at 602 may be automatically generated by the system or may be defined by the administrator user 146.

The destination site may be indicated at 604 by an identifier that represents a computing site 101. The identifier may be a numerical value and/or a text value, but it is not limited to these. The identifier indicated at 604 may be automatically generated by the system or may be defined by the administrator user 146.

The replication scope 606 may include a list of one or more types of resources that can be replicated and that are stored at the storage computing device 103 or other servers, such as compute servers. Examples of types of resources that may be replicated include "data file", "data object", "data folder", "data bucket", "data share", "data blob", "application", "application cluster", "application namespace", and/or "network". When a type of resource appears at 606, this may indicate that all the resources of that resource type should be replicated. In some examples, the replication scope 606 may include filters to specify that only resources in one or more specific servers of all the servers at the source site 602 are to be replicated. In some examples, the replication scope 606 can include filters to specify that only a subset of the resources of a particular type should be replicated. Examples of filters may include a prefix for the resource name, a suffix for the resource name, or the like. The replication scope 606 may be useful because a type of resource may not need to be replicated because that type of resource is already being replicated by other means. Additionally, the replication scope 606 is also useful because a type of resource may not need to be replicated because the storage computing device 103 in the destination site 604 may be configured to retrieve that type of resource from the source site indicated at 602 on demand. Additionally, a filter for a replication scope 606 may be useful because some resources may not be needed at the destination site 604 or may not be allowed at the destination site 604, such as according to security policies or the like. In addition, the replication scope 606 may also include a conversion from one type of resource to another type of resource. Type conversion may be useful when the types of resources stored in the storage computing device 103 at the source site indicated at 602 are different from those at the destination site indicated at 604.

In some examples, the replication scope 606 may include receiving an indication to replicate one resource as multiple resources. As one example, the replication scope 606 may indicate that the data share "Dev-Share" should be replicated as "Dev-Share1" and "Dev-Share2", and that the data files within "Dev-Share" with prefix "team1" are to be replicated to "Dev-Share1" and data files within "Dev-Share" with prefix "team2" are to be replicated to "Dev-Share2". This technique may be useful when administrator users 146 desire to manage and organize resources in a different way than at the source site indicated at 602.

The naming strategy 608 may include a strategy to select a name or identifier for use at the destination site 604 for each resource that is replicated. The naming strategy 608 may be represented, for example, by a sentence, by a script, by a set of instructions, by a path to an executable program, or the like. As one example, the goal of the naming strategy may be to select a used name that is close to the name in the source site indicated at 602, such as for ease of use while not conflicting with existing names at the destination site indicated at 604. The naming strategy 608 is useful because replicating a resource in a storage computing device 103 or other servers, such as compute servers, may typically require creating a new resource at the destination site indicated at 604 by providing a name for the resource. Some computing sites may provide a site-defined name for new resources. Some computing sites may have a naming mechanism where a part of the name is provided by the person or process creating the resource and part of the name is site-defined. Some sites may suggest a name that does not conflict with existing resources. Optionally, the naming strategy 608 may also include the target server to which the resources should be replicated. This is useful when there are multiple servers at a destination computing site.

The conflict resolution strategy 610 may include a strategy for solving naming conflicts at the destination site 604 for each resource that is replicated. The conflict resolution strategy 610 may be represented, for example, by a sentence, by a script, by a set of instructions, by a path to an executable program, or the like. The conflict resolution strategy 610 may not always be necessary. For example, if the naming strategy 608 is to accept the site-defined name, then the selected names specified by the computing site should never conflict. In such a situation, the conflict resolution strategy 610 may be indicated to be "N/A" or the like. Examples of typical conflict resolution strategies 610 may include adding a suffix or a prefix to the name of the resource received from the source site indicated at 602.

The resource replication criteria data structure 316 may include one or more rows. The rows may be added or deleted, such as in response to a request by the administrator user 146. In some cases, vendors (e.g., computing site providers) may provide guidelines or default values to assist administrator users 146 in adding information to the resource replication criteria data structure 316.

In the illustrated example, row 612 in the resource replication criteria data structure 316 shows that all resources of type "data file" stored in the storage computing device 103 at the source computing site (Site 1) should be replicated to the destination computing site (Site 2) as resources of type "data object" with the same name as that used at the source computing site (Site 1). Furthermore, row 612 also shows that all resources of type "data share" stored in the storage computing device 103 at the source computing site (Site 1) should be replicated to the destination computing site (Site 2) as resources of type "data bucket" with the same name as that used at the source computing site (Site 1), but replacing suffix "-Share" by the suffix ".bucket1".

As another example, row 614 in the resource replication criteria data structure 316 shows that all resources of type "data share" stored in the storage computing device 103 at the source computing site (Site 1) should be replicated to the destination computing site (Site 3), except the resource "Local-share", and with the same name as that used at the source computing site (Site 1). In addition, row 614 also shows that in the event of a name conflict, the data share should be skipped and a message should be sent to the administrator user 146 describing the name conflict.

FIG. 7 illustrates an example user correspondence data structure 318 according to some implementations. In the illustrated example, information in the user correspondence data structure 318 includes first computing site information (Site 1) 702, second computing site information (Site 2) 704, and third computing site information (Site 3) 706. Each column of the user correspondence data structure 318 shows information for one computing site 101 in the system 100 discussed above with respect to FIG. 1. In addition, each row of the user correspondence data structure 318 shows information of a correspondence among two or more of the computing sites 101 of an object stored in the respective directory computing devices 102.

A header row 707 of the user correspondence data structure 318 shows an identifier that represents a respective computing site 101. The identifier can be a numerical value and/or a text value, but it is not limited to these. The identifier can be automatically generated by the system or can be defined by the Administrator.

Site 1 702 shows the name or identifier and the type of an object stored in the directory computing device 102 in the computing site identified as Site 1. The type of the object is shown within parentheses at 708, 710, and 712, but it could be shown in a different way. Examples of types of objects are "user account", "service account", "user group" and "user role". Optionally, the identifier of the directory computing device 102 where the object is stored can also be included. This is useful where there are multiple directory computing devices 102 at the same computing site 101.

Site 2 704 shows the name or identifier and the type of an object stored in the directory computing device 102 at the computing site identified as Site 2. The type of the object is shown within parentheses at rows 708, 710, and 712, but the object type could be shown in a different way. Examples of types of objects are "user account", "service account", "user group" and "user role". The value "Not replicated" indicated at row 712 may be used when an object has not been replicated to the computing site identified as Site 2. Optionally, the identifier of the directory computing device 102 where the object is stored may also be included. This is useful where there are multiple directory computing devices 102 at the same computing site 101.

Site 3 706 shows the name or identifier and the type of an object stored in the directory computing device 102 in the computing site identified as Site 3. The type of the object is shown within parentheses at rows 708, 710, and 712, but the object type may alternatively be shown in a different way. Examples of types of objects are "user account", "service account", "user group" and "user role". The value "Not replicated" may be included when the object has not been replicated to the computing site identified as Site 3. In some examples, the identifier of the directory computing device 102 where the object is stored can also be included. This is useful where there are multiple directory computing devices 102 at the same computing site 101.

The user correspondence data structure 318 can have one or more rows. The rows are added, modified, or deleted by execution of the user replication program 308 as discussed additionally below. In some examples, a process or an administrator user 146 may add, modify, and/or delete rows based on previous object replications that were not carried out by the user replication program 308.

In the illustrated example, row 708 in the user correspondence data structure 318 shows that the objects "Administrators" of object type "user group" in Site 1 corresponds to the objects "Role1" of type "user role" at Site 2. The objects "Administrators" of object type "user group" in Site 1 also correspond to the objects "Administrators" of object type "user group" at Site 3.

Furthermore, as indicated at row 710 in the user correspondence data structure 318, the objects "Developers" of object type "user group" in Site 1 correspond to the objects "Role2" of type "user role" at Site 2. In addition, the objects "Developers" of object type "user group" in Site 1 also correspond to the objects "Developers1" of object type "user group" at Site 3.

Additionally, as indicated at row 712 in the user correspondence data structure 318, the object "Guest" of object type "user account" at Site 1 corresponds to the object "Guest8" of type "user account" at site 3. Row 712 further indicates that the object "Guest" of object type "user account" at Site 1 has not been replicated to Site 2, as indicated by "Not replicated".

Figure 8:
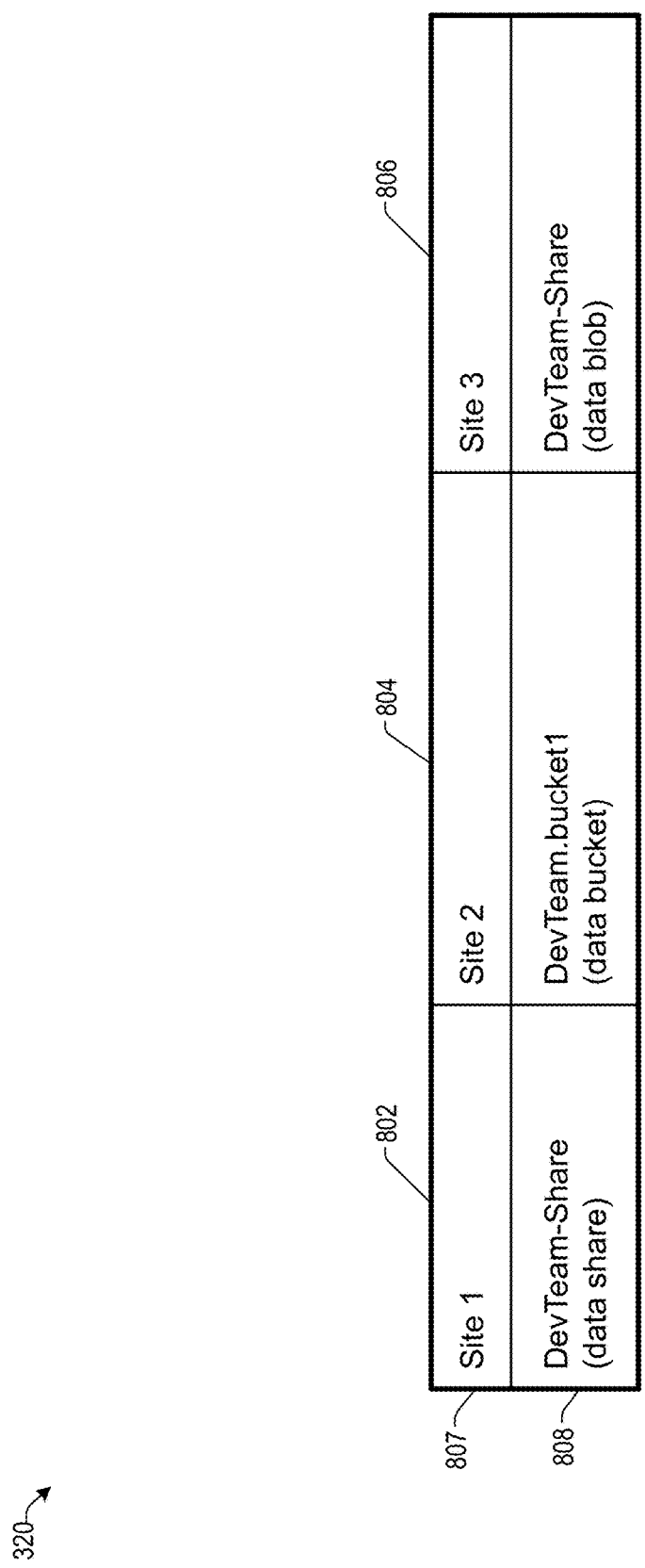
FIG. 8 illustrates an example resource correspondence data structure according to some implementations.

FIG. 8 illustrates an example resource correspondence data structure 320 according to some implementations. In the illustrated example, information in the resource correspondence data structure 320 includes information for Site 1 802, Site 2 804, and Site 3 806. In some examples, each column of the resource correspondence data structure 320 includes information for one of the computing sites 101(1)-101(3) in the system 100 discussed above with respect to FIG. 1. Further, each row of the resource correspondence data structure 320 may include information of a correspondence among two or more of the computing sites 101 of a resource stored in the storage computing device 103 or other servers, such as compute servers, of the respective computing sites 101.

A header row 807 of the resource correspondence data structure 320 shows a computing site identifier at each column that represents a respective computing site 101. The computing site identifier may be a numerical value and/or a text value, but it is not limited to these. The computing site identifier may be automatically generated by the system 100, and/or may be defined by the administrator user 146.

Site 1 802 shows the name or computing system identifier and the type of a resource stored in the storage computing device 103 or other servers, such as compute servers, in the computing site identified as Site 1. The type of the resource is shown within parentheses, but it could be shown in a different way. Examples of types of resources are "data file", "data object", "data folder", "data bucket", "data share", "data blob", "application", "application cluster", "application namespace", "network". As mentioned above, the value "Not replicated" may be used when the resource has not been replicated to the computing site identified as Site 1. In some examples, the identifier of the server where the resource is stored can also be included. This may be useful where there are multiple servers in a computing site 101 that can store a type of resource.

Site 2 804 shows the name or identifier and the type of a resource stored in the storage computing device 103 or other servers, such as compute servers, at the computing site identified as Site 2. The type of the resource is shown within parentheses, but it could be shown in a different way. Examples of types of resources are "data file", "data object", "data folder", "data bucket", "data share", "data blob", "application", "application cluster", "application namespace", "network". As mentioned above, the value "Not replicated" may be used when the resource has not been replicated to the computing site identified as Site 2. In some examples, the identifier of the server where the resource is stored may also be included. This is useful where there are multiple servers at a particular computing site that can store a type of resource.

Site 3 806 shows the name or identifier and the type of a resource stored in the storage computing device 103 or other servers such as compute servers at the computing site identified as Site 3. The type of the resource is shown within parentheses, but it could be shown in a different way. Examples of types of resources are "data file", "data object", "data folder", "data bucket", "data share", "data blob", "application", "application cluster", "application namespace", "network". As mentioned above, the value "Not replicated" may be used when the resource has not been replicated to the computing site identified as Site 3. In some examples, the identifier of the server where the resource is stored can also be included. This is useful where there are multiple servers at the same computing site 101 that can store a type of resource.

The resource correspondence data structure 320 may have one or more rows. The rows are added, modified, or deleted by the resource replication program 310. In some examples, a process or the administrator user 146 may add, modify, and/or delete rows based on previous object replications that were not carried out by the resource replication program 310.

In this example, row 808 in the resource replication program 310 shows that the resource "DevTeam-Share" of type "data share" in Site 1 corresponds to the resource "DevTeam.bucket1" of type "data bucket" at Site 2, and also corresponds to the object "DevTeam-Share" of type "data blob" at Site 3.

FIGS. 9A-9C illustrate example storage permission data structures 122 according to some implementations. The information in the storage permission data structures 122 may differ for the same user (or other object type) from one computing site 101 to the next, such as depending on the naming conventions, technology used, and other variations between the computing sites 101.

FIG. 9A illustrates an example storage permission data structure 122 according to some implementations. In this example, suppose that the storage permission data structure 122 of FIG. 9A corresponds to the first computing site 101(1) of FIG. 1, and includes information such as user 902, resource 904, and access 906. Each row of the storage permission data structure 122 may include information of a permission for a particular user to access a resource. In some examples, each storage computing device 103 at each computing site 101 may maintain a different storage permissions data structure 122.

The user 902 shows the name or other identifier and the type of an object stored in the directory computing device 102. The type of the object is shown within parentheses, but it could be shown in a different way. Examples of types of objects are "user account", "service account", "user group" and "user role". Optionally, the identifier of the directory computing device 102 where the object is stored may also be included in the storage permission data structure 122. This is useful where there are multiple directory computing devices 102 at the same computing site 101.

The resource 904 shows the name or identifier and the type of a resource stored in the storage computing device 103 or other servers, such as compute servers. The type of the resource is shown within parentheses, but it could be shown in a different way. Examples of types of resources are "data file", "data object", "data folder", "data bucket", "data share", "data blob", "application", "application cluster", "application namespace", "network". In some examples, the identifier of the server where the resource is stored can also be included in the storage permission data structure 122. This is useful where there are multiple servers at the same computing site 101 that are able to store the type of resource.

The access 906 includes the permissions that the user accounts represented by identifier at user 902 have for accessing the resources represented by the information at resource 904. The permissions can be a list of any of one or more operations that can be applied to the resource identified at 904. Examples include "read", "write", "delete", "deploy", shutdown", "create", and "duplicate".

The storage permissions data structure 122 may have one or more rows. The rows are added, modified or deleted by execution of the permission replication program 312. Rows are also added, modified or deleted by a process or administrators in order to update or configure the permissions in one of the sites and let the permission replication program 312 replicate those permission updates to the rest of the sites if needed.

In the example of FIG. 9A, row 908 in the storage permission data structure 122 shows that the user group "Developers" has "Read" and "Write" access permissions to the data share resource "DevTeam-Share".

FIG. 9B illustrates an example storage permission data structure 122 according to some implementations. In this example, suppose that the storage permission data structure 122 corresponds to the second computing site 101(2) discussed above with respect to FIG. 1. In this example, row 910 in the storage permission data structure 122 shows that the user role "Role2" has "Read" and "Write" access permissions to the data bucket resource named "DevTeam.bucket1".

FIG. 9C illustrates an example storage permission data structure 122 according to some implementations. In this example, suppose that the storage permission data structure 122 corresponds to the third computing site 101(3) discussed above with respect to FIG. 1. In this example, row 912 in the storage permissions data structure 122 includes that the user group "Developers1" has "Read" and "Write" access permissions to the data blob resource named "DevTeam-Share".

Figure 10:
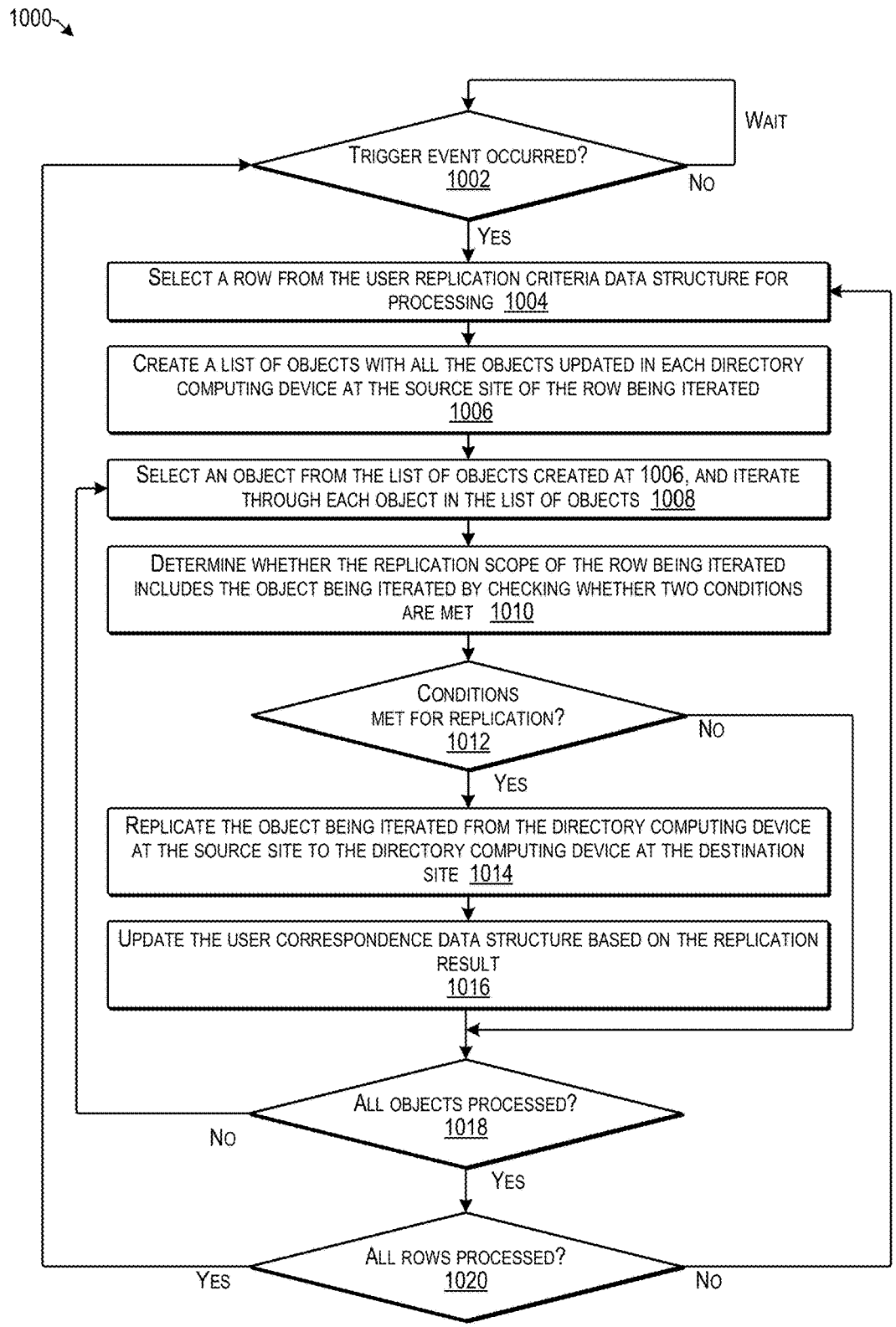
FIG. 10 is a flow diagram illustrating an example user replication process for user replication according to some implementations.
Figure 11:
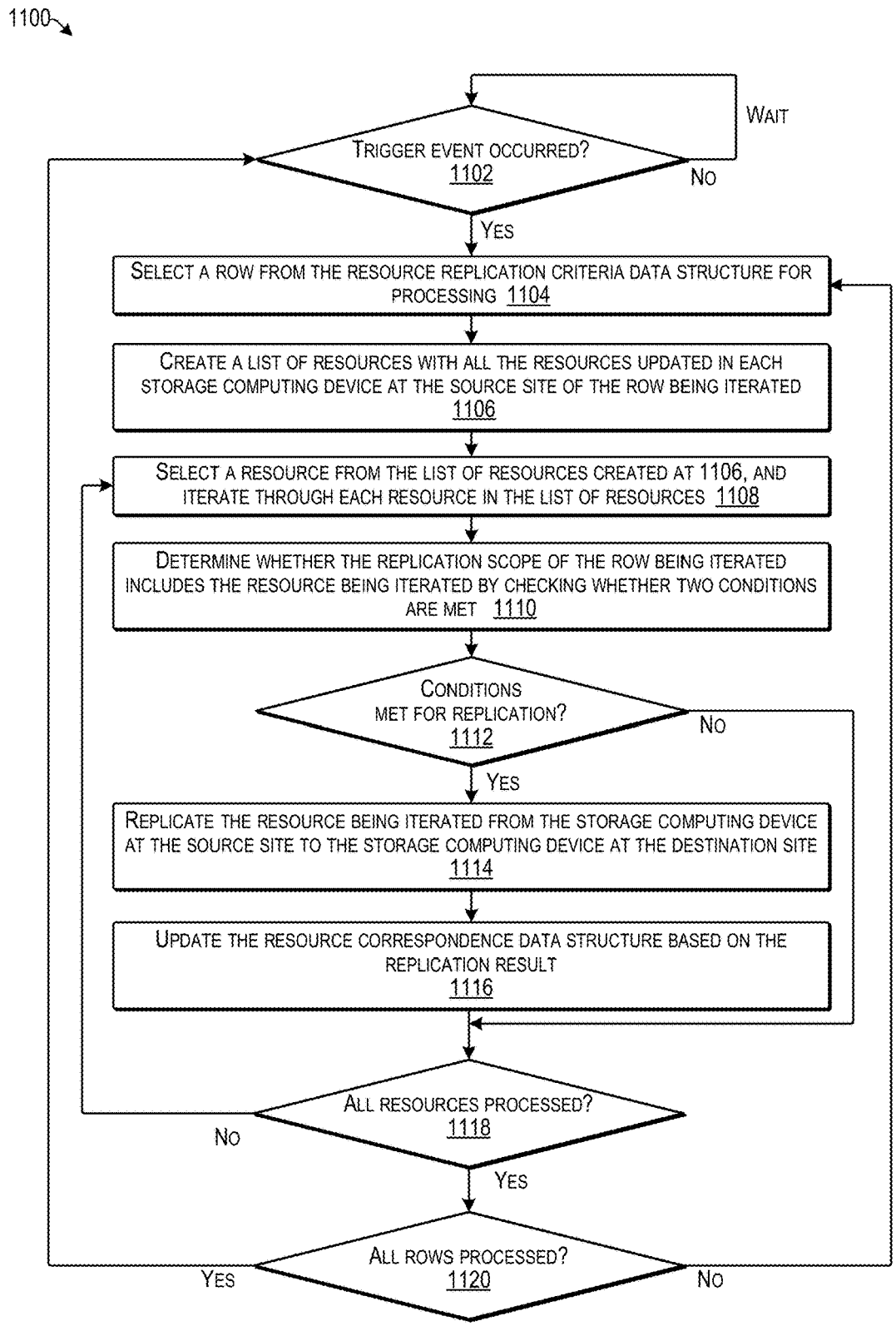
FIG. 11 is a flow diagram illustrating an example resource replication process for replicating resources according to some implementations.
Figure 12:
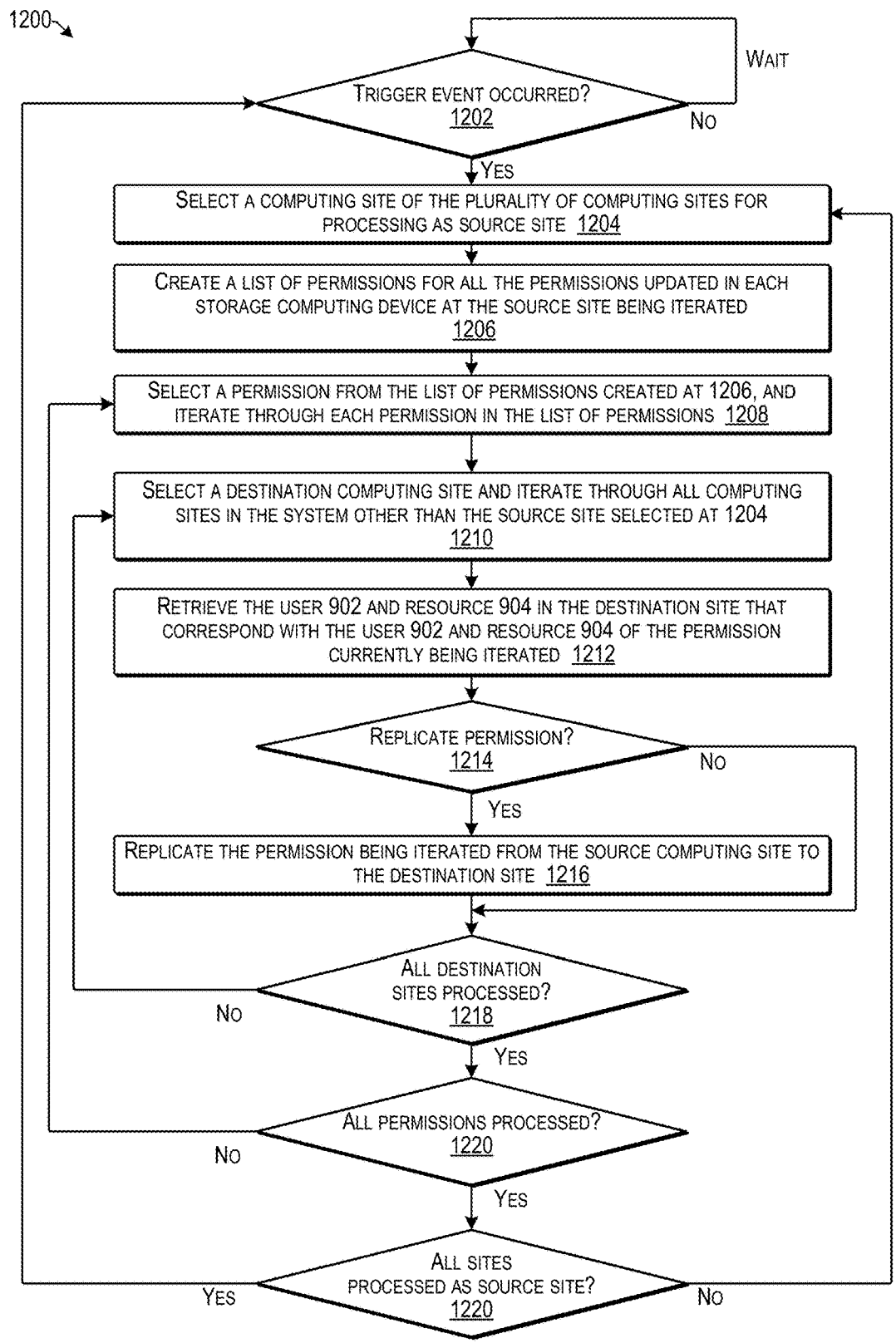
FIG. 12 is a flow diagram illustrating an example permission replication process for replicating permissions according to some implementations.

FIGS. 10-12 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 10 is a flow diagram illustrating an example user replication process 1000 for user replication according to some implementations. For example, the management computing device 104, or other suitable computing device, may execute the user replication program 308 of the management program 140 to perform at least a portion of the process 1000.

At 1002, the computing device may initiate the user replication process 1000 based on occurrence of a trigger event. For example, the user replication process 1000 may be triggered when one or more objects stored in a directory computing device 102 at one of the computing sites 101 in the system are updated, such as being created, modified, or deleted. For example, the computing device may initiate the process 1000 when a management computing device 104 receives a message from a directory computing device 102 indicating that one or more objects (e.g., a user account, user group, or the like) have been updated by a user or program that is not the user replication program 308. Additionally, or alternatively, the user replication process 1000 may be triggered for execution by the computing device periodically (for example every 20 minutes, every 40 minutes, every hour, etc.). As yet another example, the computing device may be triggered to execute the user replication process 1000 on demand, such as based on instructions received from the administrator user 146. For instance, it may be useful for the process 1000 to be executed periodically or on demand, such as when, after a period of maintenance, there may be missed updates and which may indicate that a reconciliation of replicated objects is desirable. The user replication process 1000 may also be executed periodically or on demand such as when the management computing device 104 is unable to receive a list of objects that may have been updated in the directory computing device 102 of a computing site 101, for example, because of incompatible technology or because of a security policy of the computing site 101.

At 1004, the computing device may select a row from the user replication criteria data structure 314 for processing, and may iterate through each row in the user replication criteria data structure 314. For example, each row may correspond to a computing site as a source site for replication to another computing site as a destination.

At 1006, the computing device may create a list of objects with all the objects updated in each directory computing device 102 at the source site 502 of the row being iterated. For example, the computing device may receive a list of objects (e.g., user information for one or more users) that have been updated such as based on the trigger that initiated the user replication process 1000. For instance, the computing device may query each directory computing device 102 for the updated objects that have been updated since the last time the user replication process 1000 was executed. In some examples, the query may be optimized by querying only for the objects that fulfill the replication scope 506 for the row being iterated. In the case that the computing device is unable to receive a list of objects that have been updated in the directory computing device 102 of the source computing site, all of the objects in that directory computing device 102 may be added to the list of objects. The list of objects may include the object name, the object type, the identifier of the directory computing device 102, and the type of update made to each object. Examples of types of updates to objects may include "created", "deleted", and "modified".

At 1008, the computing device may select an object from the list of objects created at 1006, and may iterate through each object in the list of objects created at 1006.

At 1010, the computing device may determine whether the replication scope 506 of the row being iterated includes the object being iterated by checking whether two conditions are true. The first condition is that the type of the object being iterated appears in the replication scope 506. The second condition may be whether the name of the object or the directory computing device 102 of the object being iterated is not specifically excluded in a filter in the replication scope 506.

At 1012, the computing device determines whether the two conditions are met. If one of the conditions is not true, the process goes to 1018. Otherwise, the process continues to 1014.

At 1014, the computing device may replicate the object (e.g., user information) being iterated from the directory computing device 102 at the source site 502 to the directory computing device 102 at the destination site 504. For example, the computing device may replicate the object by following the naming strategy 506 and the conflict resolution strategy 510 set forth in the row being iterated in the user replication criteria data structure 314. The computing device may replicate the object by applying the same type of update to the object being iterated. For example, if the object was "created" at the source site 502, then the object may also be "created" at the destination site 504. As another example, if the object was "deleted" at the source site 502, then the object may also be "deleted" at the destination site 504.

At 1016, the computing device may update the user correspondence data structure 318 according to the replication result of 1010. First, the computing device may select, in the user correspondence data structure 318, the column with a header that matches the source site 502 of the row being iterated. Next, the computing device may determine, in the selected column of the user correspondence data structure 318, the row with the name and the type of the object currently being iterated, which, in some cases, may also include the identifier of the directory computing device 102 where the object being iterated is stored. If a row is found, and if action performed was that the object was deleted, then the found row is removed from the user correspondence data structure 318 and the process goes to 1018. Otherwise, if a row is not found, then the process creates a new row for the object and writes the name and the type of the object currently being iterated in the selected column and row, and, in some examples, may include the identifier of the directory computing device 102 where the object being iterated is stored. Additionally, the computing device may select, in the user correspondence data structure 318, the column with a header that matches the destination site 504 of the row currently being iterated. If the object was not replicated at 1014, then the computing device may add "Not replicated" to the found or created row in the selected column. Otherwise, the computing device may write, in the found or created row, at the selected column, the name and type of the object replicated at 1014 and, in some examples, the identifier of the directory computing device 102 at which the replicated object is stored. In some cases, the user correspondence data structure 318 may be optimized to reduce its size by removing a row at which the object name and type are the same in all columns and there are not multiple directory computing devices 102 in the computing sites 101 in the system. In some examples, the user correspondence data structure 318 may be optimized to reduce its size by storing the correspondence as a set of rules to generate the name and/or type of a replicated object from the name and/or type of the original object in a manner similar to the naming strategy 508 in the user replication criteria data structure 314.

At 1018, the computing device may determine whether all the objects in the list of objects created at 1006 have been iterated. If not, the process goes to 1008 to select a next object from the list of objects for processing. If so, the process goes to 1020.

At 1020, the computing device may determine whether all the rows in the user replication criteria data structure 314 have been iterated. If not, the process goes to 1004 to select a next row from the user replication criteria data structure for processing. On the other hand, if all rows have been processed, the process may return to 1002 to wait for a next trigger event to occur.

A concrete example of the process 1000, may be described based on the example information contained in the data structure 1314 of FIG. 5 and data structure 1318 of FIG. 7. For instance, suppose that the object "Administrators" in column 702 of FIG. 7 is updated, which triggers execution of the user replication process 1000. Accordingly, at 1004, the computing device may perform two iterations of rows, i.e., for the first row 512 and the second row 514 of FIG. 5. For each iteration, at 1006, the process 1000 may create a list of objects that include only one object: "Administrators". Furthermore, at 1008, for each iteration the process 1000 may select the object "Administrators" for iterating the object.

For the iteration with row 512 and with the object "Administrators", at 1010, the process determines whether the conditions are met for replication of the object "Administrators" from Site 1 (source site 502) to Site 2 (destination site 504). In this example, the process decides that the object should be replicated because the object type "user group" (as indicated at 708 of FIG. 7) is in the replication scope 506 in the first row 512 of the data structure of FIG. 5. Accordingly, at 1014, the process replicates the object "Administrators" to the directory computing device 102 at the destination computing site (Site 2). In this example, based on the information in the user replication criteria data structure 314, the process replicates the object "Administrators" to Site 2 as a user role, and uses the name defined by Site 2, "Role1", for the name of the replicated object. Next, at 1016, the process updates the user correspondence data structure 318 by writing "Role1 (user role)" in the row 708 and the column 704 of the user correspondence data structure 318 in FIG. 7.

Similarly, for the iteration of row 514 of FIG. 5 and with the object "Administrators" selected for iteration, at 1010, the process checks and decides that the object "Administrator" should be replicated because the type "user group" is in the replication scope 506 for row 514. Accordingly, at 1014, the process replicates the object "Administrators" to the destination site 504 (Site 3) and keeps the same name and type because a change of name or type is not mentioned in the naming strategy 508. Next, the process updates the user correspondence data structure 318 by writing "Administrators (user group)" in the row 708 and the column 706 in the user correspondence data structure 318 of FIG. 7.

As another example based on FIGS. 5 and 7, suppose that "Developers" and "Guest" in the user correspondence data structure 318 of FIG. 7 were updated at Site 1, which triggers execution of the user replication process 1000. The object "Developers" is replicated from Site 1 to Site 3 as "Developers 1" (see row 710 and column 706) because in Site 3 there was already an object "Developers" so a number was added as a suffix to the name to solve the naming conflict, as specified at column 510 and row 514 of the user replication criteria data structure 314.

Additionally, in this example, the object "Guest" is not replicated from Site 1 to Site 2 (as indicated at column 704 and row 712 of FIG. 7) because objects of type "user account" are not in the replication scope 506 in the row 512 of the user replication criteria data structure 314 of FIG. 5. However, the object "Guest" is replicated from Site 1 to Site 3 as "Guest8" because at Site 3, there are already other objects having the names "Guest", "Guest1", "Guest2", "Guest3", "Guest4", "Guest5", "Guest6", and "Guest7", so an incremental number is added to solve the naming conflict, as specified by the user replication criteria data structure 314.

FIG. 11 is a flow diagram illustrating an example resource replication process 1100 for replicating resources according to some implementations. For example, the management computing device 104, or other suitable computing device, may execute the resource replication program 310 of the management program 140 to perform at least a portion of the process 1100.

At 1102, the computing device may initiate the resource replication process 1100 based on occurrence of a trigger event. For example, the resource replication process 1100 may be triggered when one or more objects stored in a directory computing device 102 at one of the computing sites 101 in the system are updated, such as being created, modified, or deleted. For example, the computing device may initiate the process 1000 when the management computing device 104 receives a message from a storage computing device 103 or other computing device indicating that one or more resources have been updated by a user or program that is not the resource replication program 310. Additionally, or alternatively, the resource replication process 1100 may be triggered for execution by the computing device periodically (for example every 20 minutes, every 40 minutes, every hour, etc.). As yet another example, the computing device may be triggered to execute the resource replication process 1100 on demand, such as based on instructions received from the administrator user 146. For instance, it may be useful for the resource replication process 1100 to be executed periodically or on demand, such as when, after a period of maintenance, there may be missed updates and which may indicate that a reconciliation of replicated resources is desirable. The resource replication process 1100 may also be executed periodically or on demand such as when the management computing device 104 is unable to receive a list of resources that may have been updated in the storage computing device 103 or other server of a computing site 101, for example, because of incompatible technology or because of a security policy of the computing site 101.

At 1104, the computing device may select a row from the resource replication criteria data structure 316 for processing, and may iterate through each row in the resource replication criteria data structure 316. For example, each row may correspond to a computing site as a source site for replication to another computing site as a destination.

At 1106, the computing device may create a list of resources for all the resources updated in each storage computing device 103 at the source site 602 of the row currently being iterated. For example, the process 1100 may receive the list of resources updated from the trigger or message that started the resource replication process 1100. For example, the computing device may query each storage computing device 103 for the updated resources since the last time the resource replication process 1100 was executed. Optionally, the query may be optimized by querying only for the resources that fulfill the replication scope 606 in the row being iterated. In the case that the computing device is unable to receive a list of resources updated in the storage computing device(s) 103, then all resources in the storage computing device(s) 103 may be added to the list of resources. The list of resources includes the resource name, the resource type, an ID of the storage computing device 103, and the type of update made to each resource. Examples of types of updates may include "created", "deleted", and "modified".

At 1108, the computing device may select a resource from the list of resources created at 1106, and may iterate through each resource in the list of resources created at 1106.

At 1110, the computing device may determine whether the replication scope 606 of the row being iterated includes the resource being iterated by checking whether two conditions are true. The first condition is that the type of the resource being iterated appears in the replication scope 606. The second condition may be that the name of the resource or the ID of storage computing device 103 of the resource being iterated are not specifically excluded in a filter in the replication scope 606.

At 1112, the computing device determines whether the two conditions are met. If one of the conditions is not true, the process goes to 1118. Otherwise, the process continues to 1114.

At 1114, the computing device may replicate the resource being iterated in Step 10104 from the storage computing device 103 at the source site 602 to a storage computing device 103 at the destination site 604. For example, the computing device may replicate the resource by following the naming strategy 606 and the conflict resolution strategy 610 set forth in the row being iterated in the resource replication criteria data structure 316. The computing device may replicate the resource by applying the same type of update as was applied to the resource being iterated. For example, if the resource was "created" in the source site 602, then the replicated resource is also "created" in the destination site 604. As another example, if the resource was "deleted" in the source site 602, then the resource is also "deleted" in the destination site 604. IN some cases, execution of block 1114 may be combined with execution of block 1216 in the permission replication process 1200 discussed below for security so that replicated resources have replicated permissions from the start and there is not a period where the replicated resources do not have permissions. Alternatively, the replicated object may be configured by default with the most restrictive permissions, which for some servers may be the absence of permissions.

At 1016, the computing device may update the resource correspondence data structure 320 according to the results of block 1114. First, the computing device may select, in the resource correspondence data structure 320, the column with a header that matches the source site 602 of the row being iterated. Next, the computing device may find, in the selected column, the row with the name and the type of the resource being iterated. In some cases, this location may also include the ID of the storage computing device 103 where the resource being iterated is stored. If a row is found and the resource was deleted, then the found row is removed from the resource correspondence data structure 320, and the execution proceeds to 1018. Otherwise, if a row is not located in the resource correspondence data structure 320 for the resource being iterated, then the computing device creates a new row in the resource correspondence data structure 320, writes the name of the resource in the selected column along with the type of the resource, and in some cases, the identifier of the storage computing device 103 where the resource being iterated is stored. Additionally, in the resource correspondence data structure 320, the computing device locates the column with a header that matches the destination site 604 of the row being iterated. If the resource was not replicated at 1114, then the computing device writes "Not replicated" in the selected column and the found or created row. Otherwise, if the resource was replicated, then the computing device writes in the selected column and the found or created row the name and type of the replicated resource, and in some examples may include the identifier of the storage computing device 103 where the replicated resource is stored. Additionally, in some cases, the resource correspondence data structure 320 may be optimized to reduce its size by removing a row where the resource name and type are the same in all columns and there are not multiple storage computing devices 103 in the computing sites 101 in the system. Further, in some examples, the resource correspondence data structure 320 may be optimized to reduce its size by storing the correspondence as a set of rules to generate the name and/or type of a replicated resource from the name and/or type of the original resource in a similar way as the naming strategy 608 in the resource replication criteria data structure 316. A typical scenario may include a data bucket where the name of the data bucket is replicated with a different name but all the data folders and data objects within the data bucket are replicated with their original names.

At 1118, the computing device may determine whether all the resources in the list of resources created at 1106 have been iterated. If not, the process goes to 1108 to select a next resource from the list of resources for processing. If so, the process goes to 1120.

At 1120, the computing device may determine whether all the rows in the resource replication criteria data structure 316 have been iterated. If not, the process goes to 1104 to select a next row from the resource replication criteria data structure for processing. On the other hand, if all rows have been processed, the process may return to 1102 to wait for a next trigger event to occur.

A concrete example of the process 1100 is discussed below. In this example, referring to the rows shown in the resource replication criteria data structure 316 of FIG. 6 and the resource correspondence data structure 320 of FIG. 8. For example, suppose that the object DevTeam-Share in column 802 of FIG. 8 was updated, triggering the resource replication process 1100 to be performed. Since the resource replication criteria data structure 316 has rows 612 and 614, two row iterations may be performed by the process 1100. For both iterations, the process 1100 may create a list of resources with one resource: "DevTeam-Share".

For both iterations, the process 1100 may make one iteration each with the resource "DevTeam-Share". For the iteration with the first row 612 and with "DevTeam-Share", at 1110 and 1112, the process 1100 may determine that "DevTeam-Share" should be replicated because the type "data share" is in the replication scope 606 of the resource replication criteria data structure 316 of FIG. 6. Next, the process 1100 may replicate the resource "DevTeam-Share" to Site 2 as a data bucket, and the name for the replicated resource is set as "DevTeam.bucket1" by replacing in the original name suffix "-Share" with a new suffix ".bucket1", based on the naming strategy 608 set forth in the resource replication criteria data structure 316 for in the first row 612. Next, the process 1100 updates the resource correspondence data structure 320 by writing "DevTeam.bucket1 (data bucket)" in the row 808 and the column 804 in the resource correspondence data structure 320 of FIG. 8.

For the iteration with the second row 614 and with the resource "DevTeam-Share", Step 10105 checks and decides that "DevTeam-Share" should be replicated because the type "data share" is in the replication scope 606 of the resource replication criteria data structure 316. Next, the process 1100 replicates the object DevTeam-Share to Site 3 keeping the same name and changing the type to "data blob", based on the naming strategy 608 in the second row 614 of resource replication criteria data structure 316. The process 1100 updates the resource correspondence data structure 320 by writing "DevTeam-Share (data blob)" in the row 808 and the column 806 of the resource correspondence data structure 320 of FIG. 8.

FIG. 12 is a flow diagram illustrating an example permission replication process 1200 for replicating permissions according to some implementations. For example, the management computing device 104, or other suitable computing device, may execute the permission replication program 312 of the management program 140 to perform at least a portion of the process 1200.

At 1202, the computing device may initiate the permission replication process 1200 based on occurrence of a trigger event. For example, the resource replication process 1100 may be triggered when one or more permissions configured in a storage computing device 103 (or other servers such as compute servers) are updated, such as by being created, modified, or deleted. For example, the permission replication process 1200 can be initiated when the computing device receives a message from a storage computing device 103 indicating that one or more permissions have been updated by a user or program that is not the permission replication program 312. In some examples, the permission replication process 1200 may be triggered for execution by the computing device periodically (for example every 20 minutes, every 40 minutes, every hour, etc.). As yet another example, the computing device may be triggered to execute the permission replication process 1200 on demand, such as based on instructions received from the administrator user 146. For instance, it may be useful for the permission replication process 1200 to run periodically or on demand when after a period of maintenance there may be missed updates and a reconciliation of replicated permissions is needed. It may also be useful for the permission replication process 1200 to run periodically or on demand when the computing device is unable to receive the list of permissions updated in the storage computing device 103, for example because of incompatible technology or because of a security policy.

At 1204, the computing device may select a computing site 101 for processing and may iterate through each computing site 101 in the system 100. For example, with the configuration illustrated in FIG. 1 the computing device may perform three iterations for the first computing site 101(1), the second computing site 101(2), and the third computing site 101(3), respectively. The site being iterated is also designated as the source site.

At 1206, the computing device may create a list of permissions for all the permissions that have been updated in each storage computing device 103 (and other servers, if any, such as compute servers) at the source site. For example, permissions configured at the time at which a resource is created are also considered updated permissions. However, permissions deleted when a resource is deleted are not considered updated permissions because those permissions do not need to be replicated since the corresponding resources should also have been deleted from the other computing sites 101. For example, permission replication process 1200 may receive the list of permissions updated from the trigger or message that initiated the permission replication process 1200. As one example, the computing device may query each storage computing device 103 for any updated permissions since the last time the permission replication process 1200 was executed. In the case that the computing device is unable to receive a list of permissions updated in a storage computing device 103, all permissions in that storage computing device 103 may be added to the list. The list of permissions includes the user 902, resource 904, access 906 from the permission data structure 122 of FIG. 9, as well as an ID of the storage computing device 103, and the type of update to each updated permission. Examples of types of updates are "created", "deleted", and "modified".

At 1208, the computing device may select a permission from the list of permissions created at 1206, and may iterate through each permission in the list of permissions created at 1206.

At 1010, the computing device may select a destination computing site, and may iterate through each other computing site 101 in the system, except the computing site 101 currently selected for being iterated at block 1204. The sites selected for iteration in this step are designated as destination sites.

At 1212, the computing device may retrieve the user 902 and resource 904 in the destination site that correspond with the user 902 and resource 904 of the permission currently being iterated. First, the computing device may find, in the user correspondence data structure 318, the row with a value in the column for the source site that matches the user 902 of the permission being iterated. The corresponding user 902 is the value in the found row in the column for the destination site. Next, the computing device may find, in the resource correspondence data structure 320, the row with a value in the column for the source site that matches the resource 904 of the permission being iterated. The corresponding resource 904 is the value in the found row in the column for the destination site. Optionally, if the user 902 for the permission being iterated is not found in the user correspondence data structure 318, the computing device may assume that the corresponding user 902 is an object with the same name and type. In some examples, if the resource 904 being iterated is not found in the resource correspondence data structure 320, the computing device may assume that the corresponding resource 904 in the destination site is a resource with the same name and type. This is useful when the data structures 318 and 320 are optimized to reduce their size.

At 1214, the computing device may decide whether the permission update being iterated should be replicated to the destination site. If both the corresponding user 902 and the corresponding resource 904 retrieved at 1212 have a value different than "Not replicate", then the permission replication process 1200 goes to 1216. Otherwise, the permission replication process 1200 skips to 1218. In some examples, the computing device may query the directory computing device 102 to confirm whether the object in user 902 has been replicated and may query the storage computing device 103 to determine whether the resource in resource 904 has been replicated.

At 1216, the computing device may replicate the permission being iterated from the source site to the destination site. First, the computing device accesses the storage permissions data structure 122 in the storage computing device 103 at the destination site and finds the row with the corresponding resource 904 retrieved at 1212. Next, if a new row was not located, then the computing device creates a new row with the values of the corresponding resource 904 retrieved at 1212, and the access 906 of the permission being iterated. Furthermore, if the type of update to the permission being iterated is "delete", then the computing device may delete the row. Otherwise, the computing device may overwrite the access 906 information of the found row with the access 906 information of the permission currently being iterated. In some cases, the computing device may also translate the value of access 906 from the permission format in the source site to the permission format in the destination site. For example, the format translation may be performed using a script or a program provided by administrators or by vendors of the respective computing sites 101. As one example, the computing device may translate from file data permissions to object data permissions, or vice versa. As another example, the computing device may translate from permissions of one public cloud vendor to permissions of a different public cloud vendor. In some cases, the computing device may replicate the permission by adding or removing some operations in access 906 of the permission being iterated. As one example, the permissions may be added or removed to comply with a security policy that requires enforcing more strict permissions at public sites.

At 1218, the computing device may determine whether all the destination computing sites have been iterated. If not, the process goes to 1210 to select a next destination computing site from the plurality of computing sites for processing. If so, the process goes to 1220.

At 1220, the computing device may determine whether all the permissions in the list of permissions created at 1206 have been iterated. If not, the process goes to 1208 to select a next permission from the list of permissions for processing. If so, the process goes to 1222.

At 1222, the computing device may determine whether all the computing sites in the system 100 have been iterated as a source site. If not, the process goes to 1204 to select a next computing site 101 for processing as a source site. If so, the process goes to 1202 to wait for a next trigger event.

One concrete example is described based on the rows shown in FIGS. 7, 8 and 9A. For instance, suppose that the permission row 908 in the permission data structure 122 of FIG. 9A has been updated and triggered the permission replication process 1200. The permission replication process 1200 may perform three iterations by successively designating the first computing site 101(1), the second computing site 101(2), and the third computing site 101(3) as the source site. For the iteration with the first computing site 101(1) as source site, the permission replication process 1200 creates a list with one permission, i.e., the permission 908 in FIG. 9A.

For the iterations with the second computing site 101(2) and the third computing site 101(3) as the source site, the permission replication process 1200 may create an empty list because there are no permissions updated in the second computing site 101(2) or the third computing site 101(3). Following the iteration with the first computing site 101(1) as source site, the permission replication process 1200 may perform one iteration with the permission 908 from FIG. 9A for the iteration with the first computing site 101(1). The permission replication process 1200 does not iterate for the second computing site 101(2) and the third computing site 101(3) as the source site because the list of permissions is empty.

The permission replication process 1200 may perform two iterations with the second computing site 101(2) and the third computing site 101(3) designated as the destination sites. For the iteration with the second computing site 101(2) as destination site, permission replication process 1200 may check the row 710 in FIG. 7, and retrieve "Role 2 (user role)" as the corresponding object of "Developers (user role)". Next, permission replication process 1200 checks the row 808 in FIG. 8, and retrieves "DevTeam.bucket1 (data bucket)" as the corresponding resource of "DevTeam-Share (data share)". The permission replication process 1200 may decide that the permission 908 in FIG. 9A needs to be replicated because the corresponding object and resource are not "Not replicated". The permission replication process 1200 may replicate the permission 908 from FIG. 9A by writing the row 910 in FIG. 9B with the corresponding object "Role 2 (user role)", the corresponding resource "DevTeam.bucket1 (data bucket)", and the same access 906 as in FIG. 9A.

For the iteration with the third computing site 101(3) designated as the destination site, permission replication process 1200 checks the row 710 in FIG. 7, and retrieves "Developers 1 (user group)" as the corresponding object of "Developers (user role)". Next, the permission replication process 1200 may check the row 808 in FIG. 8, and may retrieve "DevTeam-Share (data blob)" as the corresponding resource of "DevTeam-Share (data share). The permission replication process 1200 may decide that the permission 908 in FIG. 9A needs to be replicated because the corresponding object and resource are not "Not replicated". Accordingly, the permission replication process 1200 may replicate the permission 908 in FIG. 9A by writing the row 912 in FIG. 9C with the corresponding object "Developers1 (user group)", the corresponding resource "DevTeam-Share (data blob)", and the same Access 906 as in FIG. 9A.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art. Additionally, while several example systems have been described, numerous other systems able to implement the storage and capacity-usage-balancing techniques herein will be apparent to those of skill in the art having the benefit of the disclosure herein.

Figure 13:
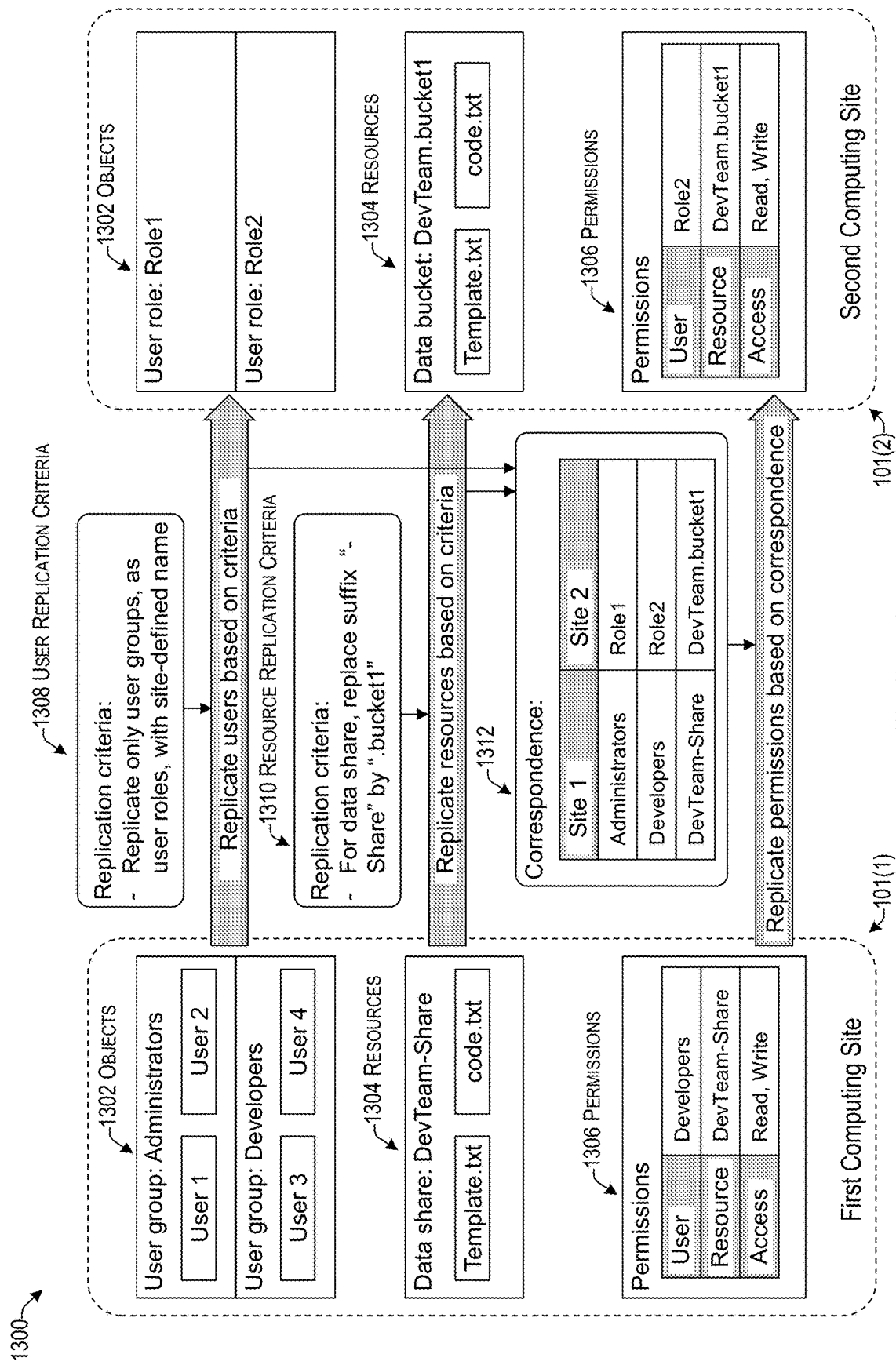
FIG. 13 illustrates an example of replication in a system according to some examples herein.

FIG. 13 illustrates an example of replication in a system 1300 according to some examples herein. In some examples, the system 1300 may correspond, at least in part to the system 100 described above with respect to FIG. 1. In this example, within each computing site 101, there are objects 1302 stored in a directory computing device 102 (not shown in FIG. 13), there are resources 1304 stored in a storage computing device 103, and there are permissions 1306 stored in a management computing device 104 (not shown in FIG. 13). The system also includes user replication criteria 1308, a resource replication criteria 1310 and a correspondence 1312.

At the first computing site 101(1) suppose that there are two objects 1302 of type "user group", namely, "Administrators" and "Developers". Furthermore, there are four objects of type "user account", namely, "User 1", "User 2", "User 3", and "User 4". In this example, "User 1" and "User 2" are assigned to the user group "Administrators", and "User 3" and "User 4" are assigned to the user group "Developers".

At the first computing site 101(1), there is one resource 1304 of type "data share", namely, "DevTeam-Share". Inside "DevTeam-Share" there are two resources 1304 of type "data file", namely "Template.txt" and "code.txt". Further, at the first computing site 101(1) there is one permission 1302 that allows users assigned to the user group "Developers" to read and write the resources in the data share "DevTeam-Share".

By executing the user replication program 308 (not shown in FIG. 13), e.g., as discussed above with respect to FIG. 10, the objects 1302 are replicated from the first computing site 101(1) to the second computing site 101(2). Based on the user replication criteria 1308, the user group "Administrator" is replicated as a user role and gets the name "Role1" defined by the second computing site 101(2) at the time the user role is created. Based on the user replication criteria 1308, the user group "Developers" is replicated as a user role and gets the name "Role2" defined by the second computing site 101(2) at the time the user role is created. Based on the user replication criteria 1308, the user accounts are not replicated to the second computing site 101(2).

By executing the resource replication program 310 (not shown in FIG. 13), e.g., as discussed above with respect to FIG. 11, the resources 1304 are replicated from the first computing site 101(1) to the second computing site 101(2). Based on the resource replication criteria 1310, the data share "DevTeam-Share" is replicated as a data bucket and the name becomes "DevTeam.bucket1" when replacing the suffix "-Share" by ".bucket1". Based on the resource replication criteria 1310, the data files "Template.txt" and "code.txt" are replicated to the second computing site 101(2) with the same name inside.

From the result of executing the user replication program 308 and the resource replication program 310, the correspondence 1312 is created. Correspondence for data files "Template.txt" and "code.txt" is omitted because they have the same name in the first computing site 101(1) and in the second computing site 101(2).

By executing the permission replication program 312 (not shown in FIG. 13), e.g., as discussed above with respect to FIG. 12, the permission 1306 is replicated from the first computing site 101(1) to the second computing site 101(2). Based on the correspondence 1312, the user "Developers" becomes "Role2" in the second computing site 101(2), the resource "DevTeam-Share" becomes "DevTeam.bucket1" in the second computing site 101(2), and the access Read, Write, stays the same in the second computing site 101(2). With this replication system, administrators can create objects and resources, and configure permissions in one of the computing sites 101. The objects, resources, and permissions may then be automatically replicated to the other computing sites 101.

Various instructions, processes, and techniques described herein may be considered in the general context of computer-executable instructions, such as programs stored on computer-readable media, and executed by the processor(s) herein. Generally, programs include routines, modules, applications, objects, components, data structures, executable code, etc., for performing particular tasks or implementing particular abstract data types. These programs, and the like, may be executed as native code or may be downloaded and executed, such as in a virtual machine or other just-in-time compilation execution environment. Typically, the functionality of the programs may be combined or distributed as desired in various implementations. An implementation of these programs may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors in communication with a non-transitory computer-readable medium storing executable instructions, the one or more processors configured by the executable instructions to perform operations comprising:
receiving, by the one or more processors, an indication to replicate user information and resource information between a plurality of computing sites;
determining, by the one or more processors, a replication criteria for replication of the user information and the resource information between a first computing site and a second computing site of the plurality of computing sites, the replication criteria including a first type of data storage for storing data at the first computing site and a second type of data storage for storing data at the second site;

performing, by the one or more processors, between the first computing site and the second computing site, the replication of the user information and the resource information based on the replication criteria including the first type of data storage and the second type of data storage;

determining, by the one or more processors, a user correspondence and a resource correspondence between the first computing site and the second computing site based on the replication of the user information and the resource information between the first computing site and the second computing site; and replicating, by the one or more processors, user permission information between the first computing site and the second computing site based on the user correspondence and the resource correspondence to automatically enable user access, via the user permission information, to the first type of data storage at the first computing site and the second type of data storage at the second site, wherein the first type of data storage uses a first storage technology that is different from a second storage technology used for the second type of data storage.

2. The system as recited in claim 1, wherein the first computing site and the second computing site each include at least a first computing device maintaining a data structure including the user permission information for accessing data managed by the first computing device, and a second computing device that maintains user account information that is used by the first computing device for verifying user credentials prior to allowing user access to the data.

3. The system as recited in claim 1, wherein replicating the user information and the resource information between the first computing site and the second computing site includes changing at least one of the user information or the resource information based on at least one of a naming conflict or a difference between the first storage technology used at the first computing site and the second storage technology used at the second computing site.

4. The system as recited in claim 1, wherein the replication criteria are based on at least one of default values received by the first computing site from the second computing site or guidelines received by the first computing site from the second computing site.

5. The system as recited in claim 1, wherein the replication criteria include that resources are grouped differently at the second computing site as compared to the first computing site based at least on a difference between the first storage technology used at the first computing site and the second storage technology used at the second computing site, and the replication criteria adjust the replicated resource information to a varied mechanism for grouping replicated resources at each of the first computing site and the second computing site.

6. The system as recited in claim 1, the operations further comprising constructing the resource correspondence between the first computing site and the second computing site by mapping identifiers of at least one of resources or resource groups replicated from the first computing site to the second computing site based at least on a difference between the first storage technology used at the first computing site and the second storage technology used at the second computing site.

7. The system as recited in claim 1, wherein determining the replication criteria for replication of the user information and the resource information between the first computing site and the second computing site further comprises determining at least one of a replication scope, a naming strategy, or a conflict resolution strategy for replicating resources between the first computing site using the first storage technology and the second computing site using the second storage technology.

8. A method comprising:

receiving, by one or more processors, an indication to replicate user information and resource information between a plurality of computing sites;

determining, by the one or more processors, a replication criteria for replication of the user information and the resource information between a first computing site and a second computing site of the plurality of computing sites, the replication criteria including a first type of data storage for storing data at the first computing site and a second type of data storage for storing data at the second site;

performing, by the one or more processors, between the first computing site and the second computing site, the replication of the user information and the resource information based on the replication criteria including the first type of data storage and the second type of data storage;

determining, by the one or more processors, a user correspondence and a resource correspondence between the first computing site and the second computing site based on the replication of the user information and the resource information between the first computing site and the second computing site; and replicating, by the one or more processors, user permission information between the first computing site and the second computing site based on the user correspondence and the resource correspondence to automatically enable user access, via the user permission information, to the first type of data storage at the first computing site and the second type of data storage at the second site, wherein the first type of data storage uses a first storage technology that is different from a second storage technology used for the second type of data storage.

9. The method as recited in claim 8, wherein the first computing site and the second computing site each include at least a first computing device maintaining a data structure including the user permission information for accessing data managed by the first computing device, and a second computing device that maintains user account information that is used by the first computing device for verifying user credentials prior to allowing user access to the data.

10. The method as recited in claim 8, wherein replicating the user information and the resource information between the first computing site and the second computing site includes changing at least one of the user information or the resource information based on at least one of a naming conflict or a difference between the first storage technology used at the first computing site and the second storage technology used at the second computing site.

11. The method as recited in claim 8, wherein the replication criteria are based on at least one of default values received by the first computing site from the second computing site or guidelines received by the first computing site from the second computing site.

12. The method as recited in claim 8, wherein the replication criteria include that resources are grouped differently at the second computing site as compared to the first computing site based at least on a difference between the first storage technology used at the first computing site and the second storage technology used at the second computing site, and the replication criteria adjust the replicated resource information to a varied mechanism for grouping replicated resources at each of the first computing site and the second computing site.

13. The method as recited in claim 8, further comprising constructing the resource correspondence between the first computing site and the second computing site by mapping identifiers of at least one of resources or resource groups replicated from the first computing site to the second computing site based at least on a difference between the first storage technology used at the first computing site and the second storage technology used at the second computing site.

14. The method as recited in claim 8, wherein determining the replication criteria for replication of the user information and the resource information between the first computing site and the second computing site further comprises determining at least one of a replication scope, a naming strategy, or a conflict resolution strategy for replicating resources between the first computing site using the first storage technology and the second computing site using the second storage technology.

15. One or more non-transitory computer-readable media storing instructions that are executable by one or more processors to configure the one or more processors to perform operations comprising:
    receiving, by the one or more processors, an indication to replicate user information and resource information between a plurality of computing sites;
    determining, by the one or more processors, a replication criteria for replication of the user information and the resource information between a first computing site and a second computing site of the plurality of computing sites, the replication criteria including a first type of data storage for storing data at the first computing site and a second type of data storage for storing data at the second site;
    performing, by the one or more processors, between the first computing site and the second computing site, the replication of the user information and the resource information based on the replication criteria including the first type of data storage and the second type of data storage;
    determining, by the one or more processors, a user correspondence and a resource correspondence between the first computing site and the second computing site based on the replication of the user information and the resource information between the first computing site and the second computing site; and
    replicating, by the one or more processors, user permission information between the first computing site and the second computing site based on the user correspondence and the resource correspondence to automatically enable user access, via the user permission information, to the first type of data storage at the first computing site and the second type of data storage at the second site, wherein the first type of data storage uses a first storage technology that is different from a second storage technology used for the second type of data storage.

16. The one or more non-transitory computer-readable media as recited in claim 15, wherein the first computing site and the second computing site each include at least a first computing device maintaining a data structure including the user permission information for accessing data managed by the first computing device, and a second computing device that maintains user account information that is used by the first computing device for verifying user credentials prior to allowing user access to the data.

17. The one or more non-transitory computer-readable media as recited in claim 15, wherein replicating the user information and the resource information between the first computing site and the second computing site includes changing the at least one of the user information or the resource information based on at least one of a naming conflict or a difference between the first storage technology used at the first computing site and the second storage technology used at the second computing site.

18. The one or more non-transitory computer-readable media as recited in claim 15, wherein the replication criteria are based on at least one of default values received by the first computing site from the second computing site or guidelines received by the first computing site from the second computing site.

19. The one or more non-transitory computer-readable media as recited in claim 15, wherein the replication criteria include that resources are grouped differently at the second computing site as compared to the first computing site based at least on the difference between the first storage technology used at the first computing site and the second storage technology used at the second computing site, and the replication criteria adjust the replicated resource information to a varied mechanism for grouping replicated resources at each of the first computing site and the second computing site.

20. The one or more non-transitory computer-readable media as recited in claim 15, the operations further comprising constructing the resource correspondence between the first computing site and the second computing site by mapping identifiers of at least one of resources or resource groups replicated from the first computing site to the second computing site based at least on a difference between the first storage technology used at the first computing site and the second storage technology used at the second computing site.

* * * * *